US012657307B2

(12) United States Patent
Ye et al.

(10) Patent No.: US 12,657,307 B2
(45) Date of Patent: Jun. 16, 2026

(54) SECURE BOOT APPARATUS AND METHOD

(71) Applicant: HUAWEI TECHNOLOGIES CO., LTD., Guangdong (CN)

(72) Inventors: Jilong Ye, Beijing (CN); Lizhong Qiao, Beijing (CN); Weicheng Gou, Beijing (CN); Tian Tang, Nanjing (CN); Zhigang Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 215 days.

(21) Appl. No.: 18/507,879

(22) Filed: Nov. 13, 2023

(65) Prior Publication Data

US 2024/0095366 A1     Mar. 21, 2024

Related U.S. Application Data

(63) Continuation of application No. PCT/CN2022/089774, filed on Apr. 28, 2022.

(30) Foreign Application Priority Data

May 12, 2021   (CN) .......................... 202110519403.7
Jun. 29, 2021   (CN) .......................... 202110730043.5

(51) Int. Cl.
G06F 21/57          (2013.01)
G01R 31/3185       (2006.01)

(52) U.S. Cl.
CPC ... G06F 21/575 (2013.01); G01R 31/318597 (2013.01); G06F 2221/034 (2013.01)

(58) Field of Classification Search
CPC ............. G06F 21/575; G06F 2221/034; G01R 31/318597
See application file for complete search history.

(56) References Cited

U.S. PATENT DOCUMENTS

| | | | |
|---|---|---|---|
| 10,796,002 B1 | 10/2020 | Raskin | |
| 11,983,274 B1* | 5/2024 | Choi | ........................ G06F 21/57 |
| 2004/0064764 A1* | 4/2004 | Gomez | ............ G01R 31/31907 |
| | | | 714/47.1 |

(Continued)

FOREIGN PATENT DOCUMENTS

| | | |
|---|---|---|
| CN | 101794362 A | 8/2010 |
| CN | 103034812 A | 4/2013 |

(Continued)

*Primary Examiner* — Zahid Choudhury

(57)          ABSTRACT

This application provides a secure boot apparatus and method. A control circuit in the secure boot apparatus can obtain boot code in a nonvolatile memory by using a non-programmable circuit, and verify the boot code by using a root of trust. In this way, even if the root of trust is not built in a processor, the verification on the boot code can be implemented by using the control circuit. This effectively reduces dependency of a secure boot process on processor performance. In addition, because the non-programmable circuit can be respectively coupled to the control circuit and the nonvolatile memory through two interfaces of different types, a requirement for the secure boot process on an interface protocol type of the control circuit is reduced, and application flexibility of a secure boot solution is improved.

20 Claims, 7 Drawing Sheets

(56) References Cited

U.S. PATENT DOCUMENTS

| | | | |
|---|---|---|---|
| 2009/0091188 A1* | 4/2009 | Michalak | H02J 9/005 |
| | | | 320/167 |
| 2018/0198628 A1* | 7/2018 | Hojsik | H04L 9/3271 |
| 2020/0151336 A1 | 5/2020 | Maletsky et al. | |
| 2022/0035926 A1* | 2/2022 | Tsai | G06F 21/74 |
| 2022/0121750 A1* | 4/2022 | Lee | G06F 9/4401 |
| 2022/0391511 A1* | 12/2022 | Samuel | G06F 21/575 |
| 2023/0134324 A1* | 5/2023 | Emerson | G06F 21/53 |
| | | | 726/26 |
| 2024/0095366 A1* | 3/2024 | Ye | G06F 9/4401 |

FOREIGN PATENT DOCUMENTS

| | | |
|---|---|---|
| CN | 109325352 A | 2/2019 |
| CN | 109670319 A | 4/2019 |

* cited by examiner

SECURE BOOT APPARATUS AND METHOD

CROSS-REFERENCE TO RELATED APPLICATIONS

This application is a continuation of International Application No. PCT/CN2022/089774, filed on Apr. 28, 2022, which claims priority to Chinese Patent Application No. 202110519403.7, filed on May 12, 2021, and Chinese Patent Application No. 202110730043.5, filed on Jun. 29, 2021. All of the aforementioned patent applications are hereby incorporated by reference in their entireties.

TECHNICAL FIELD

This application relates to the field of electronic technologies, and in particular, to a secure boot apparatus and method.

BACKGROUND

To implement secure boot of an electronic device, a root of trust (RoT) is usually built in a processor of the electronic device. After being powered on, the processor verifies, by using the root of trust, boot code (which may also be referred to as boot firmware) stored in a flash memory of the electronic device. The boot code may be a basic input/output system (BIOS). If the verification on the boot code succeeds, the processor may normally load the boot code, to implement the secure boot of the electronic device. If the verification on the boot code fails, the processor does not load the boot code, and correspondingly, the electronic device fails to boot.

However, an implementation basis of the foregoing secure boot method is that the root of trust is built in the processor. The method has high dependency on processor performance. If the root of trust is not built in the processor, the secure boot cannot be implemented.

SUMMARY

This application provides a secure boot apparatus and method, to resolve a technical problem that a secure boot method has high dependency on processor performance. To be specific, when a root of trust is not built in a processor, secure boot of the processor can also be implemented by using the foregoing method. This effectively reduces dependency of a secure boot process on the processor performance, and improves security of booting the processor.

According to an aspect, a secure boot apparatus is provided. The secure boot apparatus includes a control circuit and a non-programmable circuit; the non-programmable circuit is coupled to the control circuit through a first interface, and is coupled to a nonvolatile memory through a second interface. The control circuit stores a root of trust, and the control circuit can obtain, by using the non-programmable circuit, boot code stored in the nonvolatile memory, and verify the boot code by using the root of trust. An interface protocol type of the first interface is different from an interface protocol type of the second interface.

Based on the secure boot apparatus provided in this application, even if the root of trust is not built in the processor, the boot code may be verified by using the control circuit. This effectively reduces dependency of a secure boot process on the processor performance, and improves flexibility of the secure boot. In addition, because the non-programmable circuit can be respectively coupled to the control circuit and the nonvolatile memory through two interfaces of different protocol types, even if the control circuit does not have an interface that matches the nonvolatile memory, the boot code can still be obtained by using the non-programmable circuit. In this way, a requirement for the secure boot process on an interface protocol type of the control circuit is effectively reduced, and application flexibility of the secure boot solution is further improved. In addition, because the non-programmable circuit cannot be programmed, the boot code obtained by using the non-programmable circuit cannot be modified. Therefore, this can ensure reliability of obtaining the boot code by using the non-programmable circuit, and further ensure high reliability of a verification process.

Optionally, the non-programmable circuit may be coupled to a third interface of the control circuit through the first interface, and may be coupled to a fourth interface of the nonvolatile memory through the second interface. An interface protocol type of the third interface is a serial peripheral interface (SPI), and an interface protocol type of the fourth interface is a local bus (LBUS) interface. Therefore, the control circuit that uses the SPI may obtain, by using the non-programmable circuit, the boot code in the nonvolatile memory that uses the LBUS interface.

Because a size of the control circuit is usually small, a quantity of pins that can be disposed in the control circuit is limited. A quantity of pins needed by the SPI is small. Therefore, the control circuit obtains the boot code through the SPI. This can effectively save pin resources of the control circuit.

Optionally, the non-programmable circuit may be a joint test action group (JTAG) circuit, the JTAG circuit includes the first interface, and the interface protocol type of the first interface may be a JTAG. Because the JTAG circuit cannot be programmed, the JTAG circuit may be used as a non-programmable circuit, to ensure reliability when the boot code is obtained.

Optionally, the JTAG circuit may be integrated in an electronic component. The electronic component may be an electronic component in a device that needs to perform secure boot. Because the JTAG circuit integrated in the electronic component may be directly used as the non-programmable circuit, an additional circuit dedicated to interface conversion may be avoided. This effectively reduces costs and structural complexity of the secure boot apparatus.

Optionally, the electronic component may include a complex programmable logic device (CPLD) or a first processor, and the electronic component includes the second interface. That is, the JTAG circuit integrated in the electronic component may be coupled to the nonvolatile memory through the second interface of the electronic component.

Because the CPLD or the first processor has the second interface coupled to the nonvolatile memory, the JTAG circuit in the CPLD or the first processor may be directly used as the non-programmable circuit. In this way, changes to a structure and a connection relationship of an original component in the device can be effectively reduced, and implementation costs of the secure boot apparatus are further reduced.

Optionally, a process of obtaining, by using the non-programmable circuit, the boot code stored in the nonvolatile memory may include: controlling a working mode of the JTAG circuit to be a boundary scan mode; and obtaining the boot code.

When the JTAG circuit is in the boundary scan mode, a boundary scan cell coupled to the second interface in the JTAG circuit may isolate the second interface of the electronic component (for example, the CPLD or the first processor) from an internal logic circuit of the electronic component, and may obtain the boot code received by the second interface. Because the second interface is isolated from the internal logic circuit of the electronic component, the boot code obtained by the control circuit by using the JTAG circuit does not pass through the internal logic circuit of the electronic component. This further avoids a problem that the obtained boot code is unreliable because the internal logic circuit of the electronic component is tampered with.

Optionally, a process of controlling the working mode of the JTAG circuit to be the boundary scan mode may include: sending a first test mode selection (TMS) signal to the JTAG circuit, to control a state of the JTAG circuit to be a shift instruction register (IR) state; and then sending a first instruction to the JTAG circuit, to control the working mode of the JTAG circuit to be the boundary scan mode.

When the state of the JTAG circuit is a shift-IR state, the first instruction sent by the control circuit may be written into an IR in the JTAG circuit, to control the working mode of the JTAG circuit to be the boundary scan mode.

Optionally, a process in which the control circuit obtains the boot code may include: sending a second TMS signal to the JTAG circuit, to control the state of the JTAG circuit to be a shift data register (DR) state; then sending an address signal and a control signal to the JTAG circuit, where the address signal indicates a storage address of the boot code in the nonvolatile memory, and the control signal indicates to read data in the nonvolatile memory; and then sending shift data to the JTAG circuit, and obtaining the boot code.

When the working mode of the JTAG circuit is the boundary scan mode, and the JTAG circuit is in the shift-DR state, the address signal and the control signal sent by the control circuit to the JTAG circuit may be loaded to the second interface. After obtaining the address signal and the control signal through the second interface, the nonvolatile memory may transmit the boot code to the second interface, and the boundary scan cell that is in the JTAG circuit and that is coupled to the second interface may obtain the boot code. After the control circuit sends the shift data to the JTAG circuit, the shift data may be moved into the boundary scan cell coupled to the second interface, so that the boundary scan cell moves out, to the control circuit, the obtained boot code.

It may be understood that, because the shift data is data used to move the boot code out of the boundary scan cell, and data content of the shift data has no substantive meaning, the content of the shift data is not limited in this application. For example, the shift data may be randomly generated data, or may be data of all 0s or all 1s.

Optionally, in a scenario in which the JTAG circuit is integrated in the CPLD, the secure boot apparatus may further include a first multiplexer. The control circuit is coupled to each of a control end and a first end of the first multiplexer, a second end of the first multiplexer is coupled to a JTAG interface of a second processor, and a third end of the first multiplexer is coupled to the first interface of the JTAG circuit. The control circuit may be configured to: control the third end of the first multiplexer to be conducted with the first end, or control the third end of the first multiplexer to be conducted with the second end. The first end, the second end, and the third end of the first multiplexer are all JTAG interfaces.

It may be understood that when the third end of the first multiplexer is conducted with the first end, the control circuit is coupled to the JTAG interface of the JTAG circuit.

In this case, the control circuit may obtain, by using the JTAG circuit, the boot code stored in the nonvolatile memory. When the third end of the first multiplexer is conducted with the second end, the JTAG interface of the second processor is conducted with the JTAG interface of the JTAG circuit. In this case, the second processor may control the internal logic circuit of the CPLD by using the JTAG circuit. For example, the second processor may upgrade the internal logic circuit of the CPLD.

Because only one JTAG circuit is usually integrated in the CPLD, and the JTAG circuit includes only one JTAG interface, the JTAG interface of the JTAG circuit may be conducted with the control circuit, or conducted with the second processor by using the first multiplexer. In this way, the control circuit can obtain the boot code without affecting control on the CPLD by the second processor.

Optionally, in a scenario in which the JTAG circuit is integrated in the first processor, a memory controller configured to control the nonvolatile memory is further integrated in the first processor, and the memory controller includes the second interface. Correspondingly, a process of obtaining, by using the non-programmable circuit, the boot code stored in the nonvolatile memory may include: controlling a working mode of the JTAG circuit to be a controller control mode; and obtaining the boot code.

When the working mode of the JTAG circuit is the controller control mode, the JTAG circuit can control the memory controller, to obtain the boot code by using the memory controller.

Optionally, a process in which the control circuit controls the working mode of the JTAG circuit to be the controller control mode may include: sending a first TMS signal to the JTAG circuit, to control a state of the JTAG circuit to be a shift-IR state; and sending a second instruction to the JTAG circuit, to control the working mode of the JTAG circuit to be the controller control mode.

Optionally, a process in which the control circuit obtains the boot code may include: sending a second TMS signal to the JTAG circuit, to control the state of the JTAG circuit to be a shift-DR state; sending an address signal and a control signal to the JTAG circuit, where the address signal indicates a storage address of the boot code in the nonvolatile memory, and the control signal indicates to read data in the nonvolatile memory; and receiving the boot code sent by the JTAG circuit. The boot code is obtained by the JTAG circuit by using the memory controller.

When the working mode of the JTAG circuit is the controller control mode, and the JTAG circuit is in a shift-DR state, the address signal and the control signal sent by the control circuit to the JTAG circuit may be transmitted to the second interface of the memory controller. After obtaining the address signal and the control signal through the second interface, the nonvolatile memory may transmit the boot code to the second interface. The JTAG circuit may obtain the boot code by using the memory controller, and send the obtained boot code to the control circuit.

Optionally, the JTAG interface (that is, the first interface) of the JTAG circuit may be coupled to an SPI of the control circuit, that is, an interface protocol type of the third interface of the control circuit is the SPI. The control circuit may be further configured to implement interface protocol conversion between the SPI and the JTAG interface, that is, the control circuit may simulate a JTAG protocol through the SPI, and communicate with the JTAG interface of the JTAG circuit. In this way, the control circuit may obtain, through the SPI interface, the boot code transmitted by the JTAG circuit.

In a possible example, the secure boot apparatus may further include a second multiplexer, and the control circuit further includes a first I/O pin and a second I/O pin; the SPI includes a serial clock (SCK) pin, a master output slave input (MOSI) pin, and a master input slave output (MISO) pin, and the first interface (that is, the JTAG interface) includes a test clock (TCK) pin, a test data input (TDI) pin, a test data output (TDO) pin, and a TMS pin; the SCK pin is coupled to the TCK pin, the MISO pin is coupled to the TDO pin, the MOSI pin is coupled to a first end of the second multiplexer, a second end of the second multiplexer is coupled to the TMS pin, a third end of the second multiplexer is coupled to the TDI pin, a control end of the second multiplexer is coupled to the first I/O pin, and the second I/O pin is coupled to the TDI pin; and the control circuit can control, through the first I/O pin, the first end of the second multiplexer to be conducted with the third end; or the control circuit controls, through the first I/O pin, the first end of the second multiplexer to be conducted with the second end; and sends a signal to the TDI pin through the second I/O pin.

In this example, the control circuit may simulate, through the MOSI pin, both a TMS signal and a signal loaded to the TDI pin, and the control circuit only needs to control, through the first I/O pin, a conduction state of the second multiplexer, and simulate, by using the second pin, a few TDI signals loaded to the TDI pin. The signal simulated through the MOSI pin may be generated by a hardware controller inside the control circuit, and signal simulated through the I/O pin needs to be generated by software inside the control circuit. Because efficiency of generating a signal by the hardware controller is higher, the interface conversion manner provided based on this example can ensure high efficiency of transmitting a signal by the control circuit to the JTAG circuit, and further ensure high efficiency of obtaining the boot code.

In another possible example, the control circuit further includes a first I/O pin; the SPI includes an SCK pin, an MOSI pin, and an MISO pin, and the first interface includes a TCK pin, a TDI pin, a TDO pin, and a TMS pin; and the TCK pin is coupled to the SCK pin, the TDO pin is coupled to the MISO pin, one of the TDI pin and the TMS pin is coupled to the MOSI pin, and the other one of the TDI pin and the TMS pin is coupled to the first I/O pin.

In this example, the control circuit can be coupled to the JTAG interface by using only the SPI and one first I/O pin. Because no external conversion circuit is needed, a structure of the control circuit is simple.

Optionally, the non-programmable circuit may alternatively be a serial-to-parallel conversion circuit, the serial-to-parallel conversion circuit includes the first interface and the second interface, the interface protocol type of the first interface may be the SPI, and the interface protocol type of the second interface may be the LBUS.

Because the serial-to-parallel conversion circuit is a non-programmable hardware circuit, and can implement conversion between an SPI and an LBUS interface, so that control circuit can obtain, through the SPI of the serial-to-parallel conversion circuit, the boot code in the nonvolatile memory that uses the LBUS. In this way, not only flexibility of the secure boot is effectively improved, but also reliability of the obtained boot code can be ensured.

Optionally, the control circuit may be further coupled to a processor (that is, the foregoing first processor or second processor) configured to load the boot code. The control circuit may further control, based on that verification on the boot code succeeds, the processor to boot, and prohibit, based on that the verification on the boot code fails, the processor from booting. After the control circuit controls the processor to boot, the processor may load the boot code from the nonvolatile memory, to implement the secure boot of the device.

Optionally, based on that the verification on the boot code fails, the control circuit may further erase, by using the non-programmable circuit, the boot code stored in the non-volatile memory. In this way, even if the processor configured to load the boot code boots incorrectly, the boot code cannot be loaded. This further ensures reliability of the secure boot.

Optionally, the control circuit may be a micro control unit (MCU). Alternatively, the control circuit may be a central processing unit (CPU) independent of the first processor and the second processor.

Optionally, the secure boot apparatus may further include the nonvolatile memory. The nonvolatile memory may be a flash memory, and the flash memory may be a neither nor gate (NOR) flash memory or a not and gate (NAND) flash memory.

Optionally, the secure boot apparatus may further include the first processor or the second processor. The first processor or the second processor is coupled to the nonvolatile memory and is configured to load the boot code in the nonvolatile memory. Both the first processor and the second processor may be CPUs.

It may be understood that a product form of the secure boot apparatus provided in this application may be a chip, a board, or a device. If the secure boot apparatus is the chip, the nonvolatile memory may be disposed independently of the secure boot apparatus, that is, the secure boot apparatus does not include the nonvolatile memory. In addition, if the non-programmable circuit is not integrated in the processor configured to load the boot code, the secure boot apparatus does not include the processor configured to load the boot code, for example, does not include the second processor.

If the product form of the secure boot apparatus is the board, in addition to the control circuit and the non-programmable circuit, the secure boot apparatus may further include the nonvolatile memory and/or the processor configured to load the boot code, and the nonvolatile memory and/or the processor configured to load the boot code may be integrated with the control circuit and the non-programmable circuit on a circuit board.

If the product form of the secure boot apparatus is the device, the secure boot apparatus may not only include the control circuit, the non-programmable circuit, the nonvolatile memory, and the processor configured to load the boot code, but also may include another component, for example, may further include a housing configured to package the foregoing components, and/or a power supply circuit configured to supply power to the foregoing components.

Optionally, the device may include a server, a terminal device, a switching device, or the like. The terminal device may include a computer, internet of things (IoT) device, and the like, and the switching device may include a switch, a router, and the like.

According to another aspect, a secure boot method is provided. The secure boot method is applied to the secure boot apparatus provided in the foregoing aspect. The secure boot apparatus includes a control circuit and a non-programmable circuit; the non-programmable circuit is coupled to the control circuit through a first interface, and is coupled to a nonvolatile memory through a second interface, an interface protocol type of the first interface is different from an interface protocol type of the second interface, and the control circuit stores a root of trust. The method includes: The control circuit obtains, by using the non-programmable circuit, boot code stored in the nonvolatile memory; and verifying the boot code by using the root of trust.

Optionally, the non-programmable circuit is a JTAG circuit, and a process in which the control circuit obtains, by using the non-programmable circuit, the boot code stored in the nonvolatile memory may include: The control circuit controls a working mode of the JTAG circuit to be a boundary scan mode; and obtains the boot code.

Optionally, a process in which the control circuit controls the working mode of the JTAG circuit to be the boundary scan mode may include: The control circuit sends a first TMS signal to the JTAG circuit. The JTAG circuit sets a state of the JTAG circuit to a shift-IR state based on the first TMS signal. Then the control circuit sends a first instruction to the JTAG circuit. The JTAG circuit sets the working mode to the boundary scan mode based on the first instruction.

Optionally, a process in which the control circuit obtains the boot code may include: The control circuit sends a second TMS signal to the JTAG circuit. The JTAG circuit sets the state of the JTAG circuit to a shift-DR state based on the second TMS signal. Then the control circuit sends an address signal and a control signal to the JTAG circuit. The address signal indicates a storage address of the boot code in the nonvolatile memory, and the control signal indicates to read data in the nonvolatile memory. The JTAG circuit loads the address signal and the control signal to the second interface, and obtains the boot code received by the second interface. The control circuit sends shift data to the JTAG circuit. The JTAG circuit sends, the obtained boot code to the control circuit based on the shift data.

Optionally, the non-programmable circuit may be a JTAG circuit, the JTAG circuit is integrated in a first processor, a memory controller is further integrated in the first processor, and the memory controller includes the second interface. A process in which the control circuit obtains, by using the non-programmable circuit, the boot code stored in the non-volatile memory may include: The control circuit controls a working mode of the JTAG circuit to be a controller control mode; and obtains the boot code.

Optionally, a process in which the control circuit controls the working mode of the JTAG circuit to be the controller control mode may include: The control circuit sends a first TMS signal to the JTAG circuit. The JTAG circuit sets a state to a shift-IR state based on the first TMS signal. Then the control circuit sends a second instruction to the JTAG circuit. The JTAG circuit sets the working mode to the controller control mode based on the second instruction.

Optionally, a process in which the control circuit obtains the boot code may include: The control circuit sends a second TMS signal to the JTAG circuit. The JTAG circuit sets a state to a shift-DR state based on the second TMS signal. The control circuit sends an address signal and a control signal to the JTAG circuit. The address signal indicates a storage address of the boot code in the nonvolatile memory, and the control signal indicates to read data in the nonvolatile memory. The JTAG circuit loads the address signal and the control signal to the second interface, and obtains the boot code received by the second interface. The JTAG circuit sends the obtained boot code to the control circuit.

Optionally, the non-programmable circuit includes the first interface, the protocol type of the first interface is a JTAG, and the first interface is coupled to an SPI of the control circuit. A process in which the control circuit obtains, by using the non-programmable circuit, the boot code stored in the nonvolatile memory may further include: The control circuit converts an interface protocol of the SPI into an interface protocol of the first interface.

In a possible example, the secure boot apparatus further includes a second multiplexer, and the control circuit further includes a first I/O pin and a second I/O pin; the SPI includes an SCK pin, an MOSI pin, and an MISO pin, and the first interface includes a TCK pin, a TDI pin, a TDO pin, and a TMS pin; the SCK pin is coupled to the TCK pin, the MISO pin is coupled to the TDO pin, the MOSI pin is coupled to a first end of the second multiplexer, a second end of the second multiplexer is coupled to the TMS pin, a third end of the second multiplexer is coupled to the TDI pin, a control end of the second multiplexer is coupled to the first I/O pin, and the second I/O pin is coupled to the TDI pin. A process in which the control circuit converts the interface protocol of the SPI into the interface protocol of the first interface may include: The control circuit sends a TCK signal to the TCK pin through the SCK pin. The control circuit receives a TDO signal from the TDO pin through the MISO pin. The control circuit controls, through the first I/O pin, the first end of the second multiplexer to be conducted with the third end, and sends a TDI signal to the TDI pin through the MOSI pin; or the control circuit controls, through the first I/O pin, the first end of the second multiplexer to be conducted with the second end, sends a TMS signal to the TMS pin through the MOSI pin, and sends the TDI signal to the TMS pin through the second I/O pin.

In another possible example, the control circuit further includes a first I/O pin; the SPI includes an SCK pin, an MOSI pin, and an MISO pin, and the first interface includes a TCK pin, a TDI pin, a TDO pin, and a TMS pin; and the TCK pin is coupled to the SCK pin, the TDO pin is coupled to the MISO pin, one of the TDI pin and the TMS pin is coupled to the MOSI pin, and the other one of the TDI pin and the TMS pin is coupled to the first I/O pin. A process in which the control circuit converts the interface protocol of the SPI into the interface protocol of the first interface may include: The control circuit sends a TCK signal to the TCK pin through the SCK pin. The control circuit receives a TDO signal from the TDO pin through the MISO pin. The control circuit sends a signal to one of the TDI pin and the TMS pin through the MOSI pin. The control circuit sends a signal to the other one of the TDI pin and the TMS pin through the first I/O pin.

Optionally, the non-programmable circuit may be a serial-to-parallel conversion circuit, the serial-to-parallel conversion circuit includes the first interface and the second interface, the interface protocol type of the first interface is an SPI, and the interface protocol type of the second interface is an LBUS.

Optionally, the method may further include: Based on that the verification on the boot code fails, the control circuit erases, by using the non-programmable circuit, the boot code stored in the nonvolatile memory.

Optionally, the control circuit may be a micro control unit MCU.

For a technical effect of the secure boot method provided in the foregoing aspect, refer to the effect descriptions in the foregoing secure boot apparatus. Details are not described herein again.

According to still another aspect, a control circuit is provided. The control circuit includes a programmable logic circuit and/or program instructions, and the control circuit is configured to implement the steps performed by the control circuit in the secure boot method provided in the foregoing aspects.

According to yet another aspect, a control circuit is provided. The control circuit includes at least one module, and the at least one module may be configured to implement the steps performed by the control circuit in the secure boot method provided in the foregoing aspects.

According to still yet another aspect, a processor is provided. The processor may include a JTAG circuit, a memory controller, and a processing chip. A JTAG interface of the JTAG circuit is coupled to a control circuit, and a second interface of the memory controller is coupled to a nonvolatile memory. The JTAG circuit can obtain, through the second interface of the memory controller, boot code stored in the nonvolatile memory, and transmit the boot code to the control circuit, so that the control circuit verifies the boot code. The processing chip in the processor may obtain the boot code through the second interface of the memory controller, and load the boot code, to implement secure boot of the device.

Optionally, the JTAG circuit may be in a controller control mode under control of the control circuit, and may obtain the boot code in the controller control mode, and transmit obtained boot code to the control circuit.

According to a further aspect, a computer-readable storage medium is provided. The computer-readable storage medium stores instructions, and when the instructions are executed by a processor, the secure boot method provided in the foregoing aspects is implemented.

According to a still further aspect, a computer program product including instructions is provided. When the computer program product runs on a computer, the secure boot method provided in any one of the foregoing aspects and any possible implementation is implemented.

This application provides a secure boot method and an apparatus. A control circuit in the secure boot apparatus can obtain, by using a non-programmable circuit, boot code stored in a nonvolatile memory, and verify the boot code by using a root of trust. In this way, even if the root of trust is not built in a processor configured to load the boot code, the boot code may be verified by using the control circuit. This effectively reduces dependency of a secure boot process on processor performance, and improves flexibility of secure boot.

In addition, because the non-programmable circuit in the secure boot apparatus can be respectively coupled to the control circuit and the nonvolatile memory through two interfaces of different types, even if the control circuit does not have an interface that matches the nonvolatile memory, the boot code in the nonvolatile memory can still be obtained by using the non-programmable circuit. In this way, a requirement for the secure boot process on an interface protocol type of the control circuit is effectively reduced, and application flexibility of the secure boot solution is improved. In addition, because the non-programmable circuit cannot be programmed, reliability of obtaining the boot code by using the non-programmable circuit can be ensured, high reliability of a verification process is further ensured, and the requirement for the secure boot is met.

DESCRIPTION OF EMBODIMENTS

The following describes in detail a secure boot apparatus and method provided in embodiments of this application with reference to the accompanying drawings.

Figure 1:
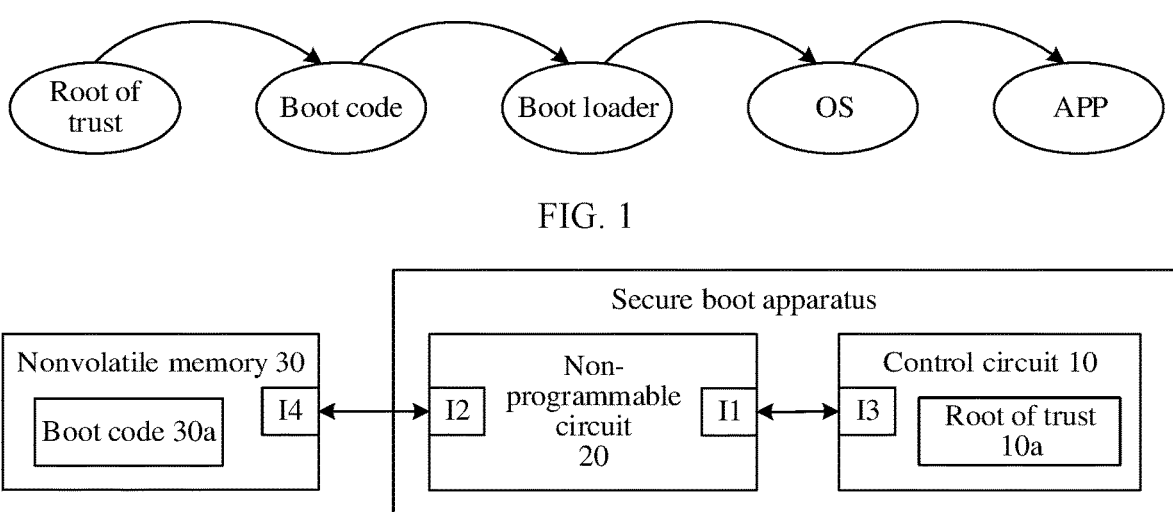
FIG. 1 is a schematic diagram of a secure boot procedure according to an embodiment of this application.

FIG. 1 is a schematic diagram of a secure boot procedure according to an embodiment of this application. As shown in FIG. 1, after being powered on, a device may first perform $1^{st}$ (first, 1st) time of boot verification on boot code in a nonvolatile memory (for example, a flash memory) by using a root of trust, and then perform a $2^{nd}$ (second, 2nd) time of boot verification on a boot loader based on the verified boot code. Then, an operating system (OS) of the device may be verified based on the verified boot loader, and an application (APP) installed in the device is verified based on the verified OS. It can be learned that after the device is powered on, level-by-level verification on the boot code, the boot loader, the OS, and the APP may be performed based on the root of trust. In a level-by-level verification process, if verification at any level fails, the device fails to boot; if the verification at all levels succeeds, the device completes secure boot.

It may be understood that, if the root of trust is built in a processor of the device, after being powered on, the processor may directly verify the boot code in the nonvolatile memory by using the root of trust. If the root of trust is not built in the processor, the boot code may be verified by using a root of trust (also referred to as an off-chip root of trust or an external root of trust) in a control circuit independent of the processor. In other words, the control circuit independent of the processor may be coupled to the nonvolatile memory, the boot code in the nonvolatile memory is obtained by using the control circuit, and the obtained boot code is verified.

Because the control circuit needs to be coupled to the nonvolatile memory, that the control circuit has an interface that adapts to the nonvolatile memory needs to be ensured. In other words, that an interface protocol type of an interface of the control circuit is the same as an interface protocol type of an interface of the nonvolatile memory needs to be ensured. In view of this, when the off-chip root of trust is used to implement secure boot, a requirement on the interface protocol type of the interface of the control circuit is high, and application flexibility of a secure boot solution is poor.

Figure 2:
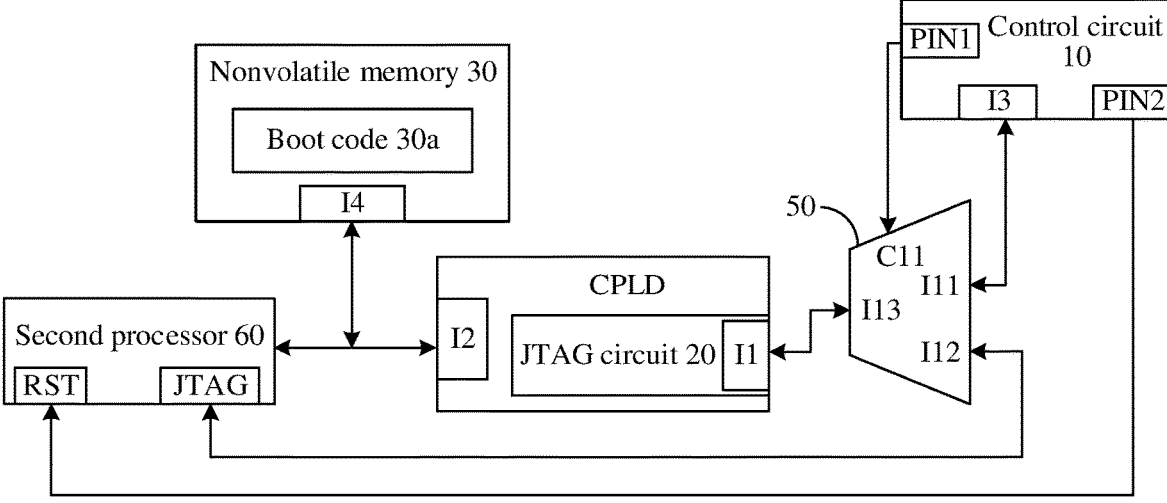
FIG. 2 is a schematic diagram of a structure of a secure boot apparatus according to an embodiment of this application.

Embodiments of this application provide a secure boot apparatus. When performing secure boot, the secure boot apparatus has low dependency on processor performance, and has a low requirement on an interface protocol type of an interface of a control circuit. In this way, flexibility of the secure boot is effectively improved. FIG. 2 is a schematic diagram of a structure of a secure boot apparatus according to an embodiment of this application. The secure boot apparatus may be used in a device that needs to implement secure boot, or the secure boot apparatus is a device that needs to implement secure boot. As shown in FIG. 2, the secure boot apparatus includes a control circuit 10 and a non-programmable circuit 20.

The non-programmable circuit 20 is coupled to the control circuit 10 through a first interface I1, and is coupled to a nonvolatile memory 30 through a second interface I2, and an interface protocol type of the first interface I1 is different from an interface protocol type of the second interface I2. For example, the interface protocol type of the first interface I1 may be an SPI, and the interface protocol type of the second interface I2 may be an LBUS.

The control circuit 10 stores a root of trust 10a. The control circuit 10 can obtain, by using the non-programmable circuit 20, boot code 30a stored in the nonvolatile memory 30, and verify the boot code 30a by using the root of trust 10a.

In this embodiment of this application, the non-programmable circuit 20 is a circuit whose logical function cannot be programmed after delivery, in other words, the logical function of the non-programmable circuit 20 cannot be tampered with. In this way, that the boot code 30a obtained by using the non-programmable circuit 20 cannot be tampered with can be ensured, high reliability of the boot code 30a is ensured, and high reliability of a verification process is further ensured.

An interface protocol refers to a communication mode and a requirement that need to be complied with between interfaces that need to exchange information. The interface protocol may specify a quantity of pins included in the interface and a function of each pin. Correspondingly, two interfaces of different interface protocol types have different quantities of pins, and/or at least one pin has a different function. It may be understood that because interfaces need to be coupled through a bus, and data is transmitted through the bus, an interface protocol of an interface may alternatively be a bus protocol of a bus coupled to the interface.

The root of trust 10a may also be referred to as a hardware root of trust or a root of trust, and is code that is written into the control circuit 10 and that cannot be tampered with. The code can be used to verify whether the boot code 30a is trustworthy.

The boot code 30a is a first segment of code that is run after a processor in the device is powered on or reset. The boot code 30a may be used to perform necessary initialization on hardware and a software environment of the device before an OS runs. For example, the boot code 30a may be BIOS code, external secure boot code (ESBC), unified extensible firmware interface (UEFI) code, or a universal boot loader (UBOOT).

It may be understood that the device that needs to perform secure boot further includes a processor configured to load the boot code 30a. The control circuit 10 in this embodiment of this application is a circuit independent of the processor, in other words, the control circuit 10 can verify the boot code 30a by using the off-chip root of trust.

In conclusion, this embodiment of this application provides the secure boot apparatus. The control circuit in the secure boot apparatus can obtain, by using the non-programmable circuit, the boot code stored in the nonvolatile memory, and verify the boot code by using the root of trust. In this way, even if the root of trust is not built in the processor configured to load the boot code, the boot code may be verified by using the control circuit. This effectively reduces dependency of a secure boot process on processor performance, and improves flexibility of the secure boot.

In addition, because the non-programmable circuit in the secure boot apparatus can be respectively coupled to the control circuit and the nonvolatile memory through two interfaces of different types, even if the control circuit does not have an interface that matches the nonvolatile memory, the boot code in the nonvolatile memory can still be obtained by using the non-programmable circuit. In this way, a requirement for the secure boot process on the interface protocol type of the control circuit is effectively reduced, and application flexibility of a secure boot solution is improved. In addition, because the non-programmable circuit cannot be programmed, reliability of obtaining the boot code by using the non-programmable circuit can be ensured, high reliability of a verification process is further ensured, and the requirement for the secure boot is met.

In this embodiment of this application, the control circuit 10 may be an MCU, and the MCU may also be referred to as a single-chip microcomputer. Alternatively, the control circuit 10 may be a CPU, and the CPU is independent of the processor configured to load the boot code 30a. The non-volatile memory 30 may be a flash memory, and the flash memory may be a NAND flash memory or a NOR flash memory.

As shown in FIG. 2, the non-programmable circuit 20 may be coupled to a third interface I3 of the control circuit 10 through the first interface I1, and may be coupled to a fourth interface I4 of the nonvolatile memory 30 through the second interface I2. An interface protocol type of the third interface I3 may be the SPI, and an interface protocol type of the fourth interface I4 may be the LBUS.

An SPI protocol defines four pins: an SCK pin, an MOSI pin, an MISO pin, and a chip select (CS) pin, and two devices that communicate with each other by using the SPI protocol work in a master-slave mode, that is, one device is a master device, and the other device is a slave device. The SCK pin is configured to transmit a clock signal, and the clock signal is generated by the master device. The MOSI pin is a data output pin of the master device and a data input pin of the slave device. The MISO pin is a data input pin of the master device and a data output pin of the slave device. The CS pin is an enable pin of the slave device and is controlled by the master device. It may be understood that the control circuit 10 in this embodiment of this application is the master device.

An LBUS protocol defines the following signal lines: a data/address multiplexing signal line, a read enable signal line, a write enable signal line, and a chip select signal line. The data/address multiplexing signal line is used to transmit data and an address signal, and a quantity of data/address multiplexing signal lines is usually 8, 16, or 32. The read enable signal line is used to transmit a read enable signal (active-low signal), and is used to perform a read operation on a controlled device (for example, the nonvolatile memory). The write enable signal line is used to transmit a write enable signal (active-low signal) and perform write and read operations on the controlled device. Based on the foregoing analysis, it can be learned that there are a large quantity of signal lines defined in the LBUS protocol, and therefore, an LBUS interface also needs a large quantity of pins.

Because a size of the control circuit 10 is usually small, a quantity of pins that can be disposed in the control circuit 10 is limited. A quantity of pins needed by the SPI is small. Therefore, the control circuit 10 obtains the boot code 30a through the SPI. This can effectively save pin resources of the control circuit 10. In addition, because the non-programmable circuit 20 can be coupled to the LBUS interface of the nonvolatile memory 30 through the second interface I2, that the control circuit 10 can obtain the boot code 30a in the nonvolatile memory 30 that uses the LBUS interface can be ensured, and application flexibility of the secure boot solution is further effectively improved.

It may be understood that the third interface I3 may be a serial interface of another interface protocol type, for example, may be an inter-integrated circuit (I2C) interface. The fourth interface I4 may alternatively be a parallel interface of another interface protocol type, for example, may alternatively be an open NAND flash interface (ONFI) or a toggle interface.

It may be further understood that the interface protocol type of the second interface I2 may be the same as the interface protocol type of the fourth interface I4. For example, the interface protocol type of the second interface I2 may also be the LBUS. The interface protocol type of the first interface I1 may be the same as or different from the interface protocol type of the third interface I3. For example, the interface protocol type of the first interface I1 may be the SPI or a JTAG.

In a specific implementation, the non-programmable circuit 20 may be a serial-to-parallel conversion circuit, and as shown in FIG. 2, the non-programmable circuit 20 has the first interface I1 and the second interface I2. The interface protocol type of the first interface I1 may be the SPI, the interface protocol type of the second interface I2 may be the LBUS, and the serial-to-parallel conversion circuit 20 can implement interface protocol conversion between the SPI and the LBUS interface.

In addition, in this implementation, the interface protocol type of the third interface I3 of the control circuit 10 may also be the SPI, and the interface protocol type of the fourth interface I4 of the nonvolatile memory 30 may be the LBUS.

Because the serial-to-parallel conversion circuit 20 is a non-programmable hardware circuit, and can implement the interface protocol conversion between the SPI and the LBUS, the control circuit 10 can obtain, through the SPI, the boot code 30a in the nonvolatile memory 30 that uses the LBUS interface. In this way, not only flexibility of the secure boot is effectively improved, but also reliability of the obtained boot code can be ensured, to further ensure reliability of the secure boot.

It may be understood that, in this implementation, the interface protocol type of the first interface I1 may alternatively be another type, for example, may be an I2C, and the interface protocol type of the second interface I2 may alternatively be another type, for example, may be an ONFI.

In another specific implementation, the non-programmable circuit 20 may be a JTAG circuit, the JTAG circuit includes the first interface I1, and the interface protocol type of the first interface I1 is the JTAG. Because the JTAG circuit cannot be programmed, the JTAG circuit may be used as the non-programmable circuit 20, to ensure reliability when the boot code 30a is obtained. In addition, a clock frequency of the JTAG circuit 20 may usually reach 10 megahertz (MHz). Therefore, a high rate of obtaining the boot code 30a by using the JTAG circuit 20 can be ensured, and high verification efficiency is further ensured.

A JTAG protocol defines four pins: a TCK pin, a TMS pin, a TDO pin, and a TDI pin. The TCK pin is configured to transmit a clock signal. The TMS pin is configured to transmit a TMS signal, and the TMS signal is used to control a state of the JTAG circuit. The TDO pin is configured to serially output data, and the TDI pin is configured to serially input data.

In this implementation, the JTAG circuit 20 may be integrated in an electronic component, the electronic component may be an integrated circuit (IC), and the electronic component may be an electronic component in the device that needs to perform secure boot. Because the JTAG circuit integrated in the electronic component may be directly used as the non-programmable circuit, an additional circuit dedicated to interface conversion may be avoided. This effectively reduces costs and structural complexity of the secure boot apparatus.

It may be understood that the electronic component has the second interface I2 coupled to the nonvolatile memory 30, and the JTAG circuit 20 may be coupled to the nonvolatile memory 30 through the second interface I2 of the electronic component.

Figure 3:
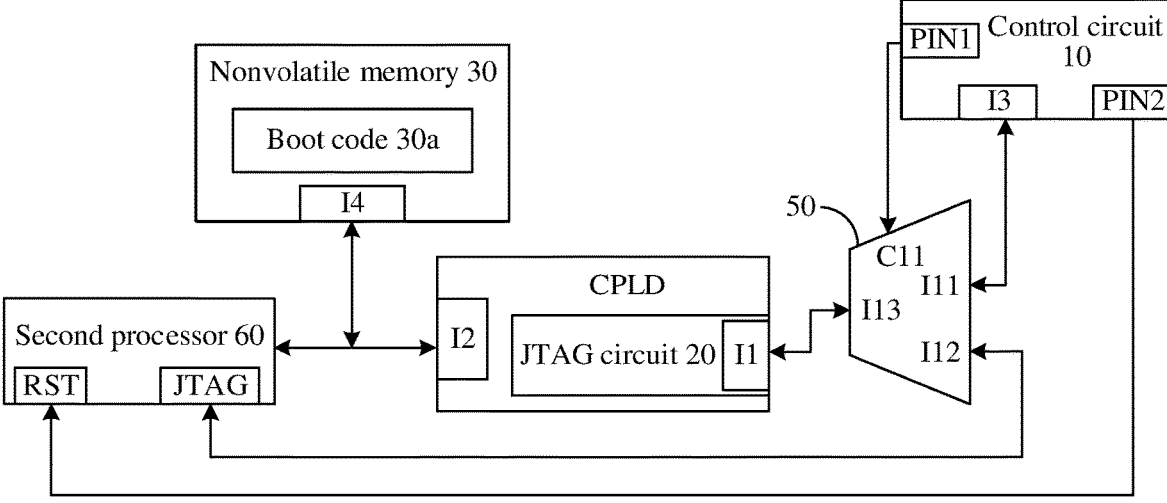
FIG. 3 is a schematic diagram of a structure of another secure boot apparatus according to an embodiment of this application.

In a possible example, as shown in FIG. 3, the JTAG circuit 20 may be integrated in a CPLD, that is, the electronic component may be the CPLD. In this example, the JTAG circuit 20 may be coupled to the nonvolatile memory 30 through the second interface I2 of the CPLD, and the second interface I2 may include a plurality of input/output (I/O) pins of the CPLD.

Figure 4:
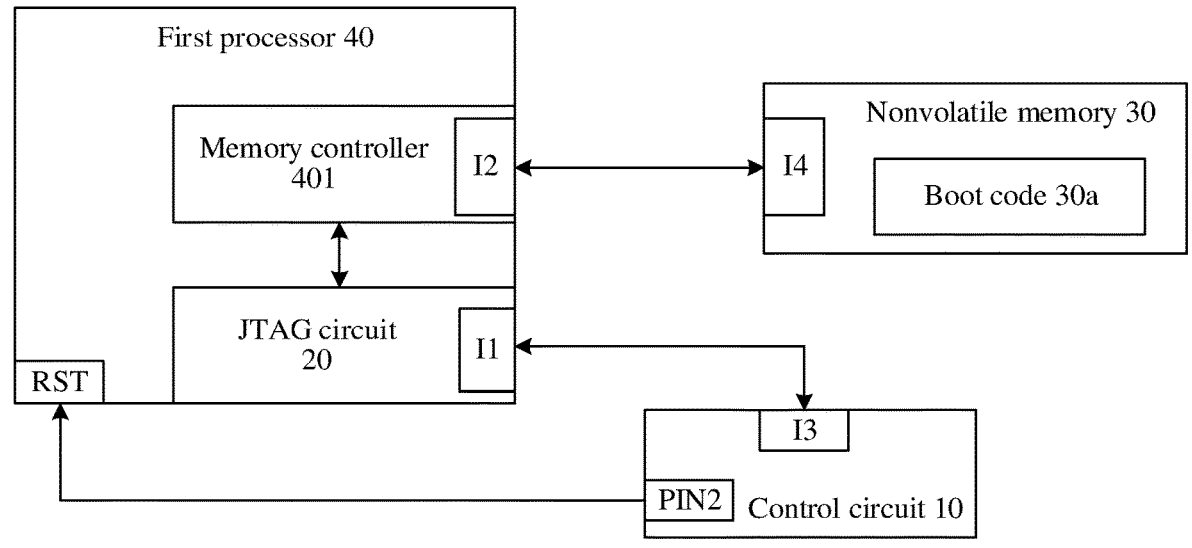
FIG. 4 is a schematic diagram of a structure of still another secure boot apparatus according to an embodiment of this application.

In another possible example, as shown in FIG. 4, the JTAG circuit 20 may be integrated in a first processor 40, that is, the electronic component may be the first processor 40. In this example, a memory controller 401 configured to control the nonvolatile memory 30 is further integrated in the first processor 40. The memory controller 401 has a second interface I2, and the second interface I2 may include a plurality of I/O pins of the memory controller 401. If the nonvolatile memory 30 is a flash memory, the memory controller 401 may be a flash memory controller.

Because the CPLD or the first processor 40 has the second interface I2 coupled to the nonvolatile memory 30, the JTAG circuit 20 in the CPLD or the first processor 40 may be directly used as the non-programmable circuit. In this way, changes to a structure and a connection relationship of an original component in the device can be effectively reduced, and implementation costs of the secure boot apparatus are reduced.

It may be understood that, in addition to the CPLD and the first processor 40, the electronic component may further include another type of chip. For example, the electronic component may further include a field programmable gate array (FPGA), an application-specific integrated circuit (ASIC), or a generic array logic (GAL) circuit.

Figure 5:
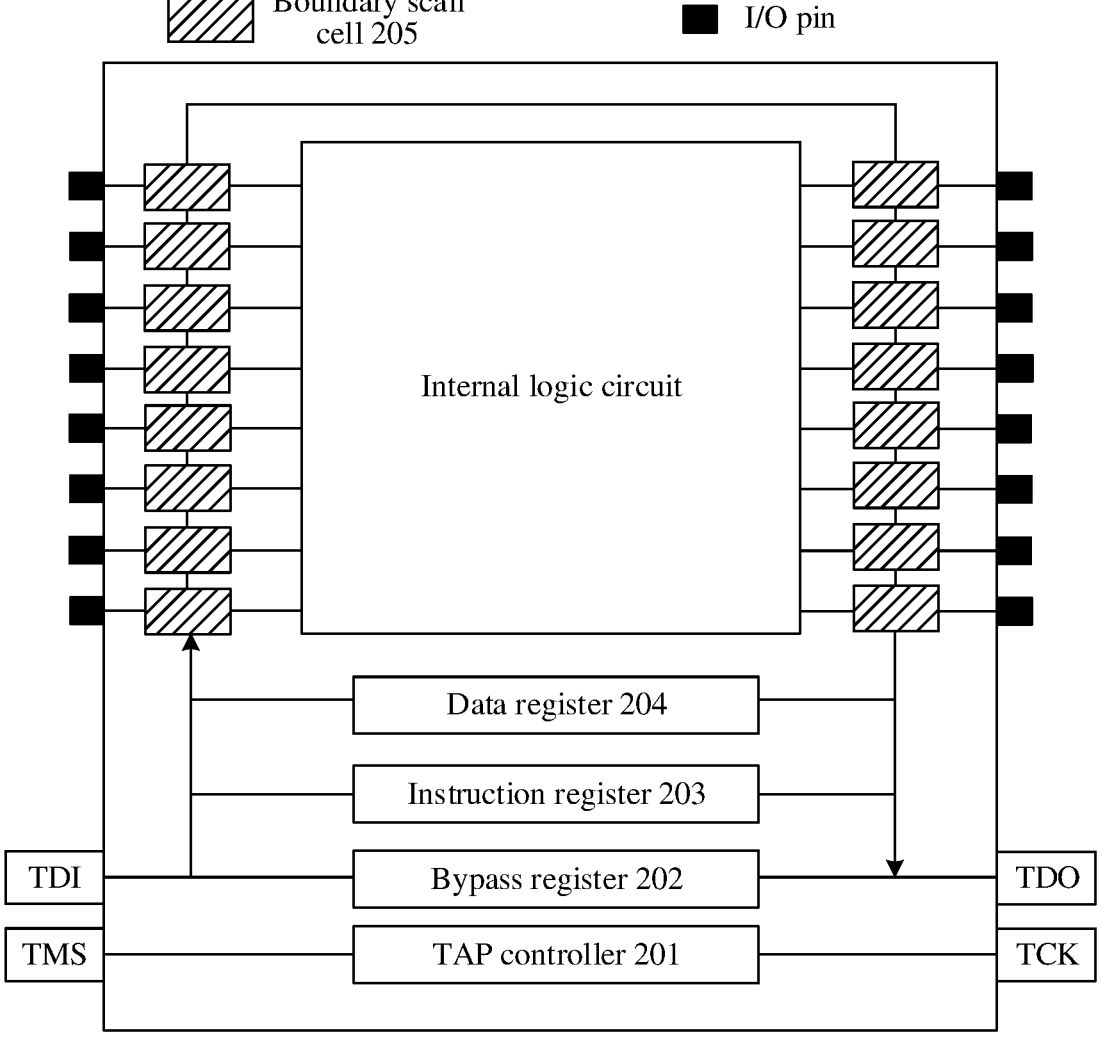
FIG. 5 is a schematic diagram of a structure of an electronic component integrating a JTAG circuit according to an embodiment of this application.

FIG. 5 is a schematic diagram of a structure of an electronic component integrating a JTAG circuit according to an embodiment of this application. Refer to FIG. 5. The JTAG circuit 20 may include: a test access port (TAP) controller 201, a bypass register 202, an IR 203, a DR 204, and a plurality of boundary scan cells (BSCs) 205. A JTAG interface (that is, a first interface I1) of the JTAG circuit 20 may include a TCK pin, a TMS pin, a TDO pin, and a TDI pin.

As shown in FIG. 5, each boundary scan cell 205 may be coupled to one I/O pin of an electronic component and an internal logic circuit of the electronic component. In addition, the plurality of boundary scan cells 205 may be serially coupled between the TDI pin and the TDO pin of the JTAG interface in sequence to form a boundary scan chain. When the electronic component works normally, each boundary scan cell 205 can transparently transmit data between the I/O pin and the internal logic circuit, in other words, the boundary scan chain formed by the plurality of boundary scan cells 205 does not affect normal working of the electronic component.

When a working mode of the JTAG circuit 20 is a boundary scan mode, the boundary scan chain formed by the plurality of boundary scan cells 205 can isolate the internal logic circuit of the electronic component from a peripheral I/O pin (for example, each I/O pin included in a second interface I2). In this case, the boundary scan chain can capture data received by each I/O pin, and may serially move the captured data out to the TDO pin of the JTAG interface. In addition, the TDI pin of the JTAG interface can further serially move data into the boundary scan chain, and the boundary scan chain may load the serially moved data to each I/O pin.

Based on the foregoing descriptions of the boundary scan mode, it can be learned that a control circuit 10 may control the working mode of the JTAG circuit 20 to be the boundary scan mode, and may obtain boot code 30*a* when the JTAG circuit 20 is in the boundary scan mode.

In the boundary scan mode, the internal logic circuit of the electronic component (for example, a CPLD or a first processor 40) to which the JTAG circuit 20 belongs can be isolated from the peripheral I/O pin. Therefore, the boot code 30*a* obtained by the control circuit 10 by using the JTAG circuit 20 does not pass through the internal logic circuit of the electronic component. In this way, a problem that the obtained boot code 30*a* is untrustworthy when the internal logic circuit of the electronic component is tampered with can be avoided, that is, reliability of the boot code 30*a* obtained by using the JTAG circuit 20 is ensured.

Figure 6:
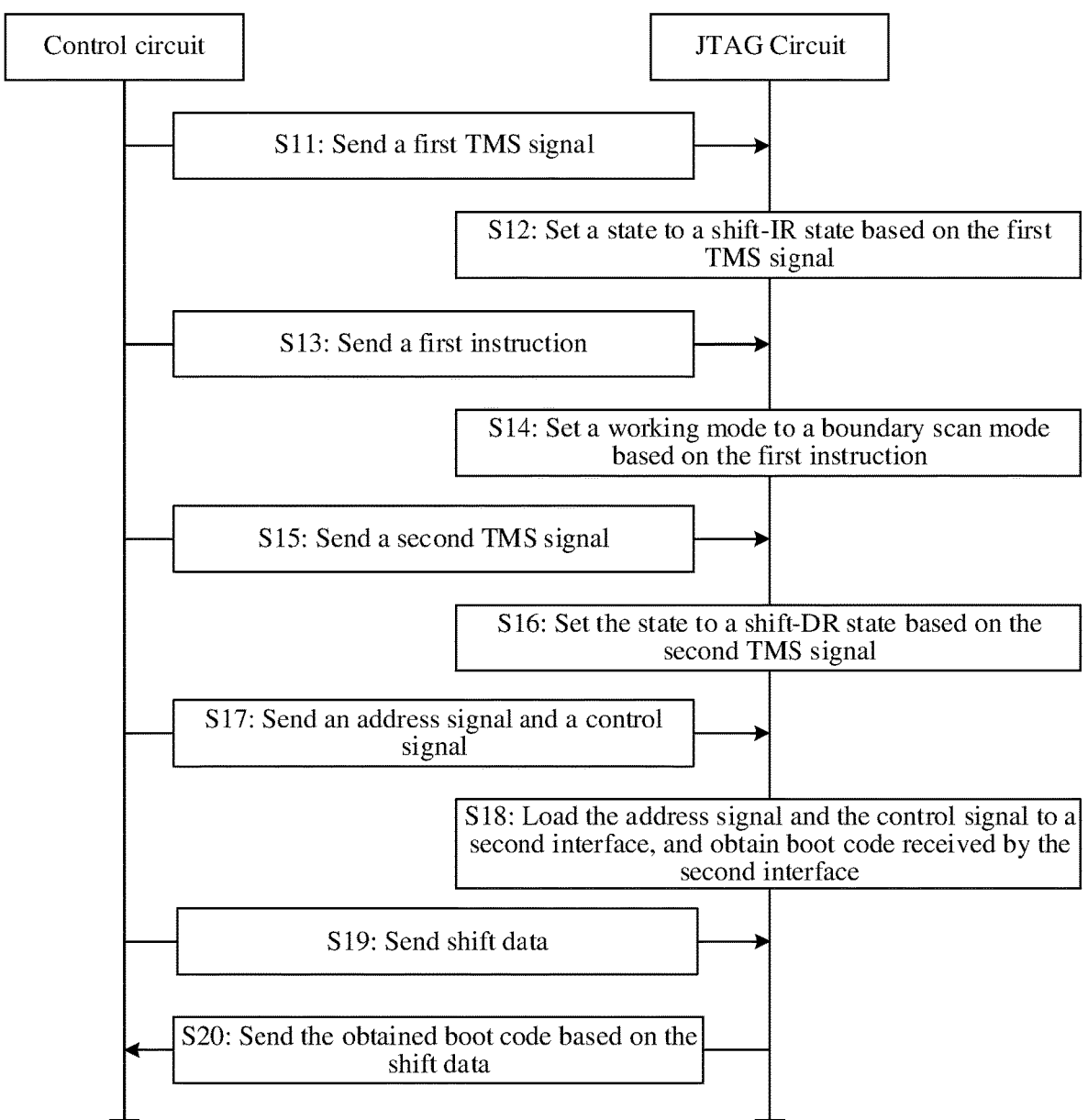
FIG. 6 is a flowchart in which a control circuit obtains boot code by using a JTAG circuit according to an embodiment of this application.

FIG. 6 is a flowchart in which a control circuit obtains boot code by using a JTAG circuit according to an embodiment of this application. As shown in FIG. 6, a process in which the control circuit obtains the boot code may include the following steps.

Step S11: The control circuit sends a first TMS signal to the JTAG circuit 20.

In this embodiment of this application, the control circuit 10 may send the first TMS signal to a TMS pin of the JTAG circuit 20, to control a state of the JTAG circuit 20 to be a shift-IR state.

Step S12: The JTAG circuit sets the state to the shift-IR state based on the first TMS signal.

When the JTAG circuit 20 is in the shift-IR state, the control circuit 10 can write instructions to an IR 203 of the JTAG circuit 20. It may be understood that the state of the JTAG circuit 20 is a state of a TAP controller 201 in the JTAG circuit 20.

Figure 7:
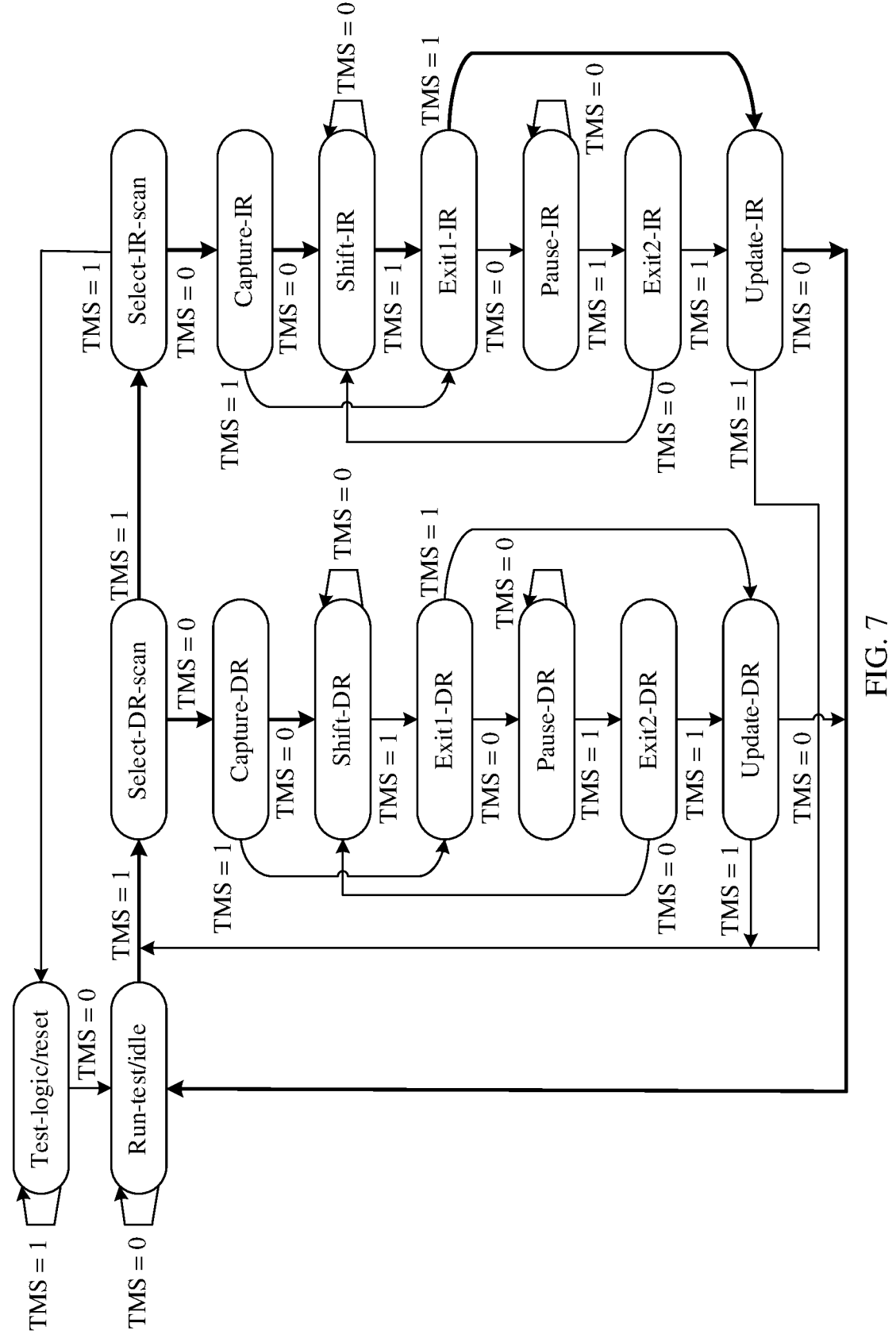
FIG. 7 is a schematic diagram of a state machine of a TAP controller according to an embodiment of this application.

FIG. 7 is a schematic diagram of a state machine of the TAP controller according to an embodiment of this application. As shown in FIG. 7, the TAP controller 201 has 16 states in total: test-logic/reset, run-test/idle, select-DR-scan, capture-DR, shift-DR, exit1-DR, pause-DR, exit2-DR, update-DR, select-IR-scan, capture-IR, shift-IR, exit1-IR, pause-IR, exit2-IR, and update-IR. The state of the TAP controller 201 may be changed under control of a TMS signal received by the TMS pin. In the state machine shown in FIG. 7, TMS=1 indicates that the TMS signal is of a high electrical level, and TMS=0 indicates that the TMS signal is of a low electrical level.

Refer to FIG. 7. It can be learned that, the first TMS signal required for controlling the TAP controller 201 to switch to the shift-IR state varies with an initial state of the TAP controller 201. For example, assuming that the initial state of the TAP controller 201 is the run-test/idle state, the state of the TAP controller 201 needs to be first sequentially switched to the select-DR-scan state, the select-IR-scan state, and the capture-IR state, and then switched from the capture-IR state to the shift-IR state. Correspondingly, an electrical level change of the first TMS signal may be: a high electrical level, a high electrical level, a low electrical level, and a low electrical level in sequence, that is, values of the TMS signal are 1, 1, 0, and 0 in sequence.

Step S13: The control circuit sends a first instruction to the JTAG circuit.

When the JTAG circuit 20 is in the shift-IR state, the control circuit 10 may send the first instruction to a TDI pin of the JTAG circuit 20, and the first instruction may be written into an IR 203 of the JTAG circuit 20, so that a working mode of the JTAG circuit 20 is switched to a boundary scan mode. The first instruction may be an instruction that is prestored in the control circuit 10 and that can be used to switch the working mode of the JTAG circuit 20 to the boundary scan mode. A length of the first instruction may be 8 bits or 16 bits.

Step S14: The JTAG circuit sets the working mode to the boundary scan mode based on the first instruction.

When the working mode of the JTAG circuit 20 is the boundary scan mode, a boundary scan chain coupled to a second interface I2 of an electronic component may isolate the second interface I2 from an internal logic circuit of the electronic component. In addition, the boundary scan chain may capture data received by the second interface I2, and may load data to the second interface I2.

Step S15: The control circuit sends a second TMS signal to the JTAG circuit.

After setting the working mode of the JTAG circuit 20 to the boundary scan mode, the control circuit 10 may continue to send the second TMS signal to the TMS pin of the JTAG circuit 20, to switch the state of the TAP controller 201 of the JTAG circuit 20 to the shift-DR state.

For example, refer to the state machine shown in FIG. 7. If the state of the TAP controller 201 is the shift-IR state, the state of the TAP controller 201 may be first switched to the exit1-IR state, the update-IR state, and the run-test/idle state in sequence. Then, the run-test/idle state is switched to the select-DR-scan state, the capture-DR state, and the shift-DR state in sequence. Correspondingly, an electrical level change of the second TMS signal may be: a high electrical level, a high electrical level, a low electrical level, a high electrical level, a low electrical level, and a low electrical level in sequence, that is, values of the TMS are 1, 1, 0, 1, 0, and 0 in sequence.

Step S16: The JTAG circuit sets the state to the shift-DR state based on the second TMS signal.

When the TAP controller 201 is in the shift-DR state, the control circuit 10 can serially move data into the boundary scan chain through the TDI pin of the JTAG circuit 20, and the boundary scan chain may load the serially moved data to the second interface I2.

Step S17: The control circuit sends an address signal and a control signal to the JTAG circuit.

The control circuit 10 may send the address signal and the control signal to the TDI pin of the JTAG circuit 20. The address signal indicates a storage address of the boot code 30a in the nonvolatile memory 30, and the control signal indicates to read data in the nonvolatile memory 30. That is, the control signal may indicate to read data (that is, the boot code 30a) at a storage location indicated by the address signal. The storage address of the boot code 30a in the nonvolatile memory 30 may be prestored in the control circuit 10.

Step S18: The JTAG circuit loads the address signal and the control signal to the second interface, and obtains the boot code received by the second interface.

When the working mode of the JTAG circuit 20 is the boundary scan mode and the state is the shift-DR state, the address signal and the control signal that are received by the JTAG circuit 20 through the TDI pin can be serially moved into the boundary scan chain coupled to the second interface I2. The boundary scan chain may load the serially moved address signal and the control signal to the second interface I2 of the electronic component to which the JTAG circuit 20 belongs. The nonvolatile memory 30 coupled to the second interface I2 may transmit, to the second interface I2 based on the indication of the address signal and the control signal, the boot code 30a stored in the nonvolatile memory 30. The boundary scan chain coupled to the second interface I2 in the JTAG circuit 20 may capture the boot code 30a received by the second interface I2.

The following describes an implementation process of step S18 by using an example in which both the second interface I2 and a fourth interface I4 of the nonvolatile memory 30 are LBUS interfaces. Because the LBUS interface includes a data/address multiplexing signal line, a read enable signal line, a write enable signal line, and the like, the address signal may be loaded to an I/O pin coupled to the data/address multiplexing signal line in the second interface I2, and the control signal may be loaded to an I/O pin coupled to the read enable signal line in the second interface I2, that is, the control signal may be a read enable signal. After reading the address signal by using the data/address multiplexing signal line and reading the control signal by using the read enable signal line, the nonvolatile memory 30 may transmit the boot code 30a to the second interface I2 by using the data/address multiplexing signal line.

Step S19: The control circuit sends shift data to the JTAG circuit.

In this embodiment of this application, the control circuit 10 may send the shift data to the TDI pin of the JTAG circuit 20 after preset duration after the address signal and the control signal are sent. The preset duration may be greater than or equal to total duration required by the JTAG circuit 20 to load the address signal and the control signal to the second interface I2, the nonvolatile memory 30 to transmit the boot code 30a to the second interface I2 based on the address signal and the control signal, and the boundary scan chain of the JTAG circuit 20 to capture the data received by the second interface I2. In other words, after the preset duration, that the boundary scan chain of the JTAG circuit 20 captures the boot code 30a transmitted by the nonvolatile memory 30 can be ensured. An order of magnitude of the preset duration may be a nanosecond (ns) order. For example, the preset duration may be 10 ns to 20 ns.

Step S20: The JTAG circuit sends the obtained boot code to the control circuit based on the shift data.

When the JTAG circuit 20 is in the boundary scan mode and is in the shift-DR state, as shown in FIG. 5, the TDI pin of the JTAG circuit 20, the boundary scan chain coupled to the second interface I2, and the TDO pin are coupled. After the control circuit 10 sends the shift data to the TDI pin of the JTAG circuit 20, the shift data can be serially moved into the boundary scan chain. In this way, the boot code 30a captured by the boundary scan chain may be serially moved out to the TDO pin. In other words, the boundary scan chain of the JTAG circuit 20 may transmit the boot code to the control circuit 10 through the TDO pin. The control circuit 10 may further obtain the boot code 30a.

It can be learned from the foregoing descriptions that the shift data is data used to serially move the boot code 30a in the boundary scan chain out to the TDO pin, and content of the shift data has no substantive meaning. Therefore, the content of the shift data is not limited in this embodiment of this application. For example, the shift data may be randomly generated data, or may be data of all 0s, or may be data of all 1s.

It may be further understood that, because a data amount of the boot code 30a is usually greater than a data bit width of the second interface I2 (that is, a data amount of data that can be received by the second interface I2 at a time), based on the foregoing steps S11 to S20, the control circuit 10 can obtain only a part of the boot code 30a. Correspondingly, the control circuit 10 and the JTAG circuit 20 may repeatedly perform the foregoing steps S11 to S20 to obtain complete boot code 30a.

Figures 8, 9:
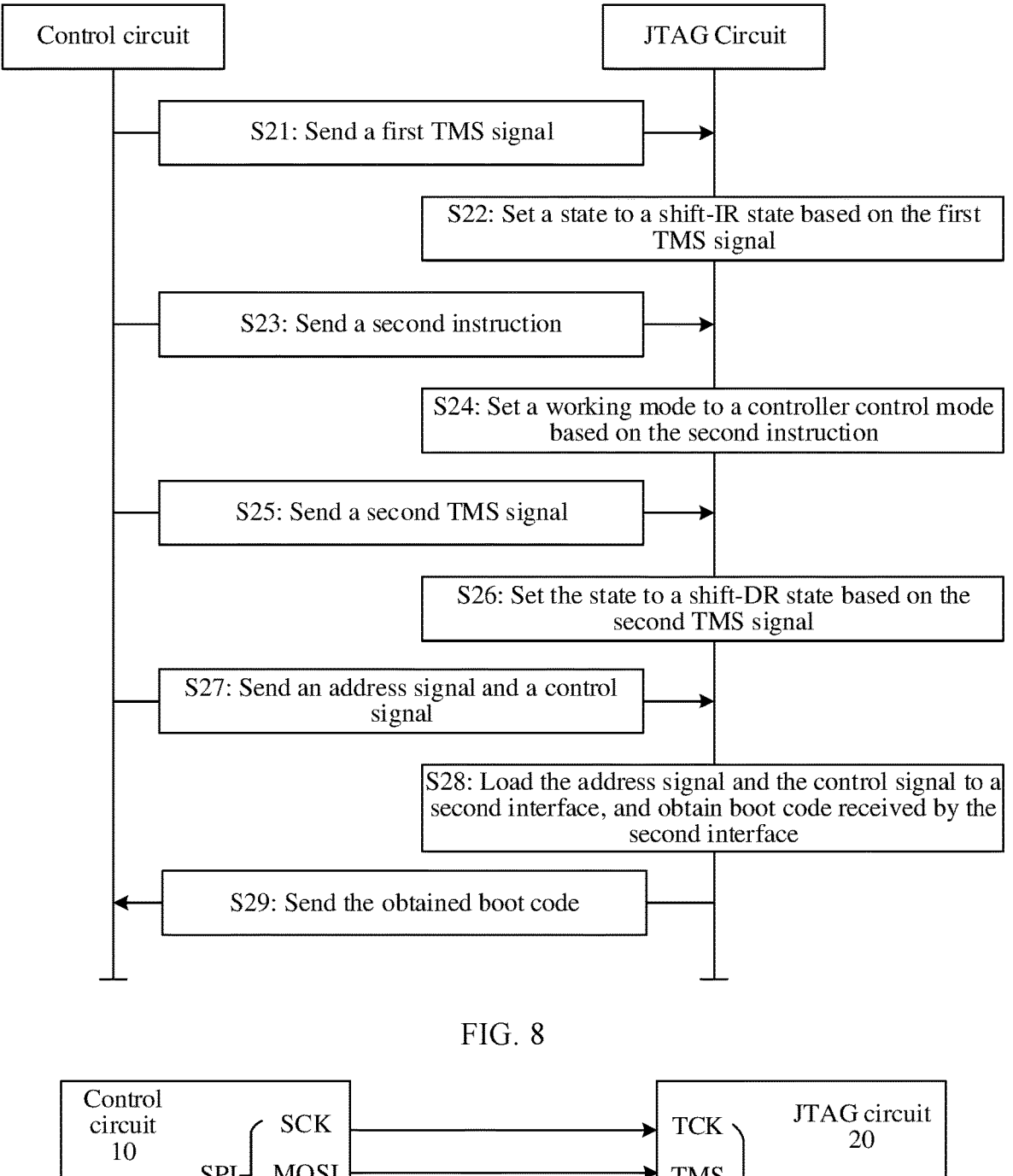
FIG. 8 is another flowchart in which a control circuit obtains boot code by using a JTAG circuit according to an embodiment of this application.
FIG. 9 is a schematic diagram of a connection between an SPI and a JTAG interface of a control circuit according to an embodiment of this application.

In a scenario in which the JTAG circuit 20 is integrated in the first processor 40, in addition to obtaining the boot code 30a when the JTAG circuit 20 is in the boundary scan mode, the control circuit 10 may further control the working mode of the JTAG circuit 20 to be a controller control mode, and obtain the boot code 30a when the JTAG circuit 20 is in the controller control mode. FIG. 8 is another flowchart in which a control circuit obtains boot code by using a JTAG circuit according to an embodiment of this application. As shown in FIG. 8, a process in which the control circuit obtains the boot code may include the following steps.

Step S21: The control circuit sends a first TMS signal to the JTAG circuit.

For an implementation process of step S21, refer to step S11. Details are not described herein again.

Step S22: The JTAG circuit sets a state to a shift-IR state based on the first TMS signal.

For an implementation process of step S22, refer to step S12. Details are not described herein again.

Step S23: The control circuit sends a second instruction to the JTAG circuit.

When the JTAG circuit 20 is in the shift-IR state, the control circuit 10 may send the second instruction to a TDI pin of the JTAG circuit 20, and the second instruction may be written into an IR 203 of the JTAG circuit 20, so that a working mode of the JTAG circuit 20 is switched to a controller control mode. A second instruction may be an instruction that is prestored in the control circuit 10 and that can be used to switch the working mode of the JTAG circuit 20 to the controller control mode. For example, a length of the second instruction may be 8 bits or 16 bits.

Step S24: The JTAG circuit sets the working mode to the controller control mode based on the second instruction.

When the working mode of the JTAG circuit 20 is the controller control mode, the JTAG circuit 20 can control a memory controller 401 in a first processor 40, or it may be understood that the JTAG circuit 20 can take over the memory controller 401.

Step S25: The control circuit sends a second TMS signal to the JTAG circuit.

For an implementation process of step S25, refer to step S15. Details are not described herein again.

Step S26: The JTAG circuit sets the state to a shift-DR state based on the second TMS signal.

For an implementation process of step S26, refer to step S16. Details are not described herein again.

Step S27: The control circuit sends an address signal and a control signal to the JTAG circuit.

The control circuit 10 may send the address signal and the control signal to the TDI pin of the JTAG circuit 20. The address signal indicates a storage address of the boot code in a nonvolatile memory 30, and the control signal indicates to read data in the nonvolatile memory 30.

Step S28: The JTAG circuit loads the address signal and the control signal to a second interface, and obtains the boot code received by the second interface.

When the working mode of the JTAG circuit 20 is the controller control mode, and the state of the JTAG circuit 20 is the shift-DR state, after receiving the address signal and the control signal through the TDI pin of the JTAG circuit 20, the JTAG circuit 20 may load the address signal and the control signal to a second interface I2 of the memory controller 401. After receiving the address signal and the control signal that are transmitted by the second interface I2 of the memory controller 401, the nonvolatile memory 30 may transmit, to the second interface I2 based on the indication of the address signal and the control signal, boot code 30a stored in the nonvolatile memory 30. The JTAG circuit 20 may obtain, by using the memory controller 401, the boot code 30a received by the second interface I2.

Step S29: The JTAG circuit sends the obtained boot code to the control circuit.

After obtaining the boot code 30a, the JTAG circuit 20 may send the boot code 30a to the control circuit 10 through a TDO pin. Correspondingly, the control circuit 10 may receive the boot code 30a transmitted by the TDO pin of the JTAG circuit 20.

It may be understood that, if the JTAG circuit 20 is integrated in the first processor 40, and the first processor 40 supports performing control on the memory controller 401 by using the JTAG circuit 20, the control circuit 10 may obtain the boot code 30a in the manner in step S21 to step S29. If the first processor 40 does not support performing control on the memory controller 401 by using the JTAG circuit 20, the control circuit 10 may obtain the boot code 30a in the manner in step S11 to step S20.

In a scenario in which the JTAG circuit 20 is integrated in a CPLD, as shown in FIG. 3, the secure boot apparatus may further include a first multiplexer (MUX) 50, and the multiplexer may also be referred to as a data selector or a multiplex switch.

Refer to FIG. 3. The control circuit 10 may be coupled to a control end C11 and a first end I11 of the first multiplexer 50, a second end I12 of the first multiplexer 50 is coupled to a JTAG interface of a second processor 60, and a third end I13 of the first multiplexer 50 is coupled to the first interface I1 (that is, a JTAG interface of the JTAG circuit 20). The second processor 60 is a processor configured to load the boot code 30a to implement secure boot.

The control circuit 10 may control the third end I13 of the first multiplexer 50 to be conducted with the first end I11, or control the third end I13 of the first multiplexer 50 to be conducted with the second end I12. The first end I11, the second end I12, and the third end I13 of the first multiplexer 50 are all JTAG interfaces.

It may be understood that, when the third end I13 of the first multiplexer 50 is conducted with the first end I11, the third interface I3 of the control circuit 10 is coupled to the JTAG interface of the JTAG circuit 20. In this case, the control circuit 10 may obtain, by using the JTAG circuit 20, the boot code 30a stored in the nonvolatile memory 30.

When the third end I13 of the first multiplexer 50 is conducted with the second end I12, the JTAG interface of the second processor 60 is conducted with the JTAG interface of the JTAG circuit 20, and the second processor 60 may control an internal logic circuit of the CPLD by using the JTAG circuit 20. For example, the second processor 60 may upgrade the internal logic circuit of the CPLD.

Because only one JTAG circuit 20 is usually integrated in the CPLD, and the JTAG circuit 20 includes only one JTAG interface, in this embodiment of this application, the JTAG interface of the JTAG circuit 20 may be conducted with the control circuit 10 or conducted with the second processor 60 by using the first multiplexer 50. In this way, the control circuit 10 can obtain the boot code 30a without affecting control on the CPLD by the second processor 60.

For example, as shown in FIG. 3, the control circuit 10 may further include a first control pin PIN1, and the first control pin PIN1 may be coupled to the control end C11 of the first multiplexer 50. The control circuit 10 may transmit a selection signal of a first electrical level or a second electrical level to the first end I11 of the first multiplexer 50 by using the first control pin PIN1. If the selection signal is of the first electrical level, the third end I13 of the first multiplexer 50 may be conducted with the first end I11; or if the selection signal is of the second electrical level, the third end I13 of the first multiplexer 50 may be conducted with the second end I12. The first control pin PIN1 may be a GPIO pin of the control circuit 10. The first electrical level may be a high electrical level or a low electrical level relative to the second electrical level. This is not limited in this embodiment of this application.

It may be understood that, if a plurality of JTAG circuits are integrated in the CPLD, the control circuit 10 and the second processor 60 may be separately coupled to JTAG interfaces of different JTAG circuits in the CPLD. Correspondingly, the first multiplexer 50 may not be disposed in the secure boot apparatus provided in this embodiment of this application.

In this embodiment of this application, in a scenario in which the first interface I1 is the JTAG interface of the JTAG circuit 20, and the third interface I3 of the control circuit 10 is an SPI, the control circuit 10 may be further configured to implement interface protocol conversion between the SPI and the JTAG interface. That is, the control circuit 10 may send, to the JTAG interface through the SPI, a signal that meets a JTAG protocol.

In a possible example, as shown in FIG. 9, the control circuit 10 further includes a first I/O pin IO1, and the first I/O pin IO1 may be a general-purpose input/output (GPIO) pin.

As shown in FIG. 9, in this example, a TCK pin of the JTAG interface is coupled to an SCK pin of the SPI, and the TDO pin of the JTAG interface is coupled to a MISO pin of the SPI. To be specific, the control circuit 10 may simulate a TCK signal through the SCK pin, and load the TCK signal to the TCK pin of the JTAG circuit 20, and the control circuit 10 may receive, through the MISO pin, a TDO signal transmitted by the JTAG circuit 20 through the TDO pin.

Still refer to FIG. 9. One (for example, a TMS pin in FIG. 9) of the TDI pin and the TMS pin of the JTAG interface is coupled to the MOSI pin of the SPI, and the other one (for example, the TDI pin in FIG. 9) of the TDI pin and the TMS pin is coupled to the first I/O pin IO1. To be specific, the control circuit 10 may simulate, through the MOSI pin and the first I/O pin IO1, a TMS signal to be loaded to the TMS pin and a TDI signal to be loaded to the TDI pin.

It may be understood that signals simulated by the control circuit 10 through the SCK pin and the MOSI pin may all be generated by a hardware controller inside the control circuit 10. A signal simulated by the control circuit 10 through the first I/O pin IO1 needs to be generated by software inside the control circuit 10.

In this example, the control circuit 10 can be coupled to the JTAG interface by using only the SPI and one first I/O pin IO1. Because no external conversion circuit is needed, a structure of the control circuit 10 is simple.

Figure 10:
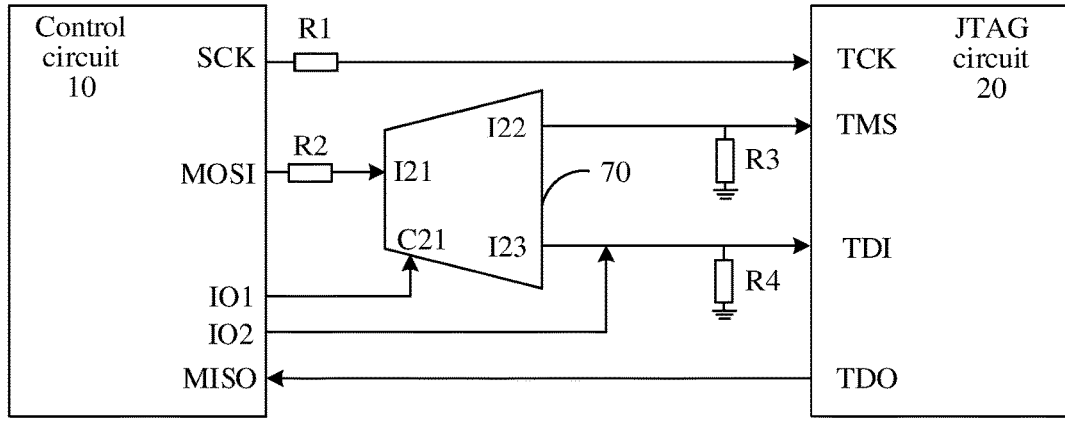
FIG. 10 is a schematic diagram of another connection between an SPI and a JTAG interface of a control circuit according to an embodiment of this application.

In another possible example, as shown in FIG. 10, the secure boot apparatus may further include a second multiplexer 70. The control circuit 10 further includes a first I/O pin IO1 and a second I/O pin IO2, and both IO1 and IO2 may be GPIO pins.

As shown in FIG. 10, in this example, an SCK pin of the SPI is coupled to a TCK pin of the JTAG interface, and a MISO pin of the SPI is coupled to the TDO pin of the JTAG interface. The MOSI pin of the SPI is coupled to a first end I21 of the second multiplexer 70, a second end I22 of the second multiplexer 70 is coupled to a TMS pin of the JTAG interface, a third end I23 of the second multiplexer 70 is coupled to the TDI pin of the JTAG interface, a control end C21 of the second multiplexer 70 is coupled to the first I/O pin IO1, and the second I/O pin IO2 is coupled to the TDI pin.

The control circuit 10 may be further configured to: control, through the first I/O pin IO1, the first end I21 of the second multiplexer 70 to be conducted with the third end I23, or control the first end I21 of the second multiplexer 70 to be conducted with the second end I22, and send a TDI signal to the TDI pin through the second I/O pin IO2.

When the first end I21 of the second multiplexer 70 is conducted with the third end I23, the MOSI pin of the SPI is conducted with the TDI pin, and the control circuit 10 may transmit the TDI signal to the TDI pin through the MOSI pin. For example, the control circuit 10 may transmit a first instruction, a second instruction, an address signal and a control signal, or shift data to the TDI pin through the MOSI pin.

When the first end I21 of the second multiplexer 70 is conducted with the second end I22, the MOSI pin of the SPI is conducted with the TMS pin, and the control circuit 10 may transmit a TMS signal to the TMS pin through the MOSI pin. For example, the control circuit 10 may transmit a first TMS signal or a second TMS signal to the TMS pin through the MOSI pin.

It may be understood that, after the MOSI pin of the SPI is switched to be conducted with the TMS pin, the control circuit 10 may further need to transmit the TDI signal to the TDI pin. In this case, the TDI signal may be transmitted to the TDI pin through the second I/O pin IO2. For example, the control circuit 10 may transmit, to the TDI pin through the second I/O pin IO2, the last 1-bit data to be written into a register (which may be the IR 203 or a DR 204) in the shift-IR state or the shift-DR state.

It may be further understood that, when the second multiplexer 70 conducts the MOSI pin with the TDI pin, an electrical level of the TMS signal loaded to the TMS pin is a low electrical level. When the second multiplexer 70 conducts the MOSI pin with the TMS pin, an electrical level of a signal loaded to the TDI pin is a low electrical level.

It can be learned from the foregoing analysis that, in this example, the control circuit 10 may simulate both the TMS signal and the TDI signal through the MOSI pin, and the control circuit 10 needs to control a conduction state of the second multiplexer 70 by using only the first I/O pin IO1, and simulate a small quantity of TDI signals (for example, 1-bit data) by using the second pin IO2. In other words, the TMS signal and most TDI signals may be generated by the hardware controller inside the control circuit 10, and only a few signals need to be generated by the software inside the control circuit 10. Because efficiency of generating a signal by the hardware controller is high, an interface conversion manner provided based on this example can ensure high efficiency of transmitting a signal by the control circuit 10 to the JTAG circuit 20, and may further ensure high efficiency of obtaining the boot code 30*a*.

As shown in FIG. 10, in this example, the secure boot apparatus may further include a first current limiting resistor R1, a second current limiting resistor R2, a first pull-down resistor R3, and a second pull-down resistor R4. One end of the first current limiting resistor R1 is coupled to the SCK pin, and the other end is coupled to the TCK pin. One end of the second current limiting resistor R2 is coupled to the MOSI pin, and the other end is coupled to the first end I21 of the second multiplexer 70. One end of the first pull-down resistor R3 is coupled to the TMS pin, and the other end is grounded (GND). One end of the second pull-down resistor R4 is coupled to the TDI pin, and the other end is grounded.

The first current limiting resistor R1 is configured to reduce a magnitude of a current between the SCK pin and the TCK pin, and the second current limiting resistor R2 is configured to reduce a magnitude of a current between the MOSI pin and the second multiplexer 70. Therefore, power consumption of the secure boot apparatus can be effectively reduced. The first pull-down resistor R3 may be configured to ensure electrical level stability of the TMS pin, and the second pull-down resistor R4 may be configured to ensure electrical level stability of the TDI pin.

In this embodiment of this application, the control circuit 10 may be further coupled to a processor configured to load the boot code 30*a*. For example, in the scenario in FIG. 3, the processor configured to load the boot code 30*a* is the second processor 60; and in the scenario in FIG. 4, the processor configured to load the boot code 30*a* is the first processor 40 integrating the JTAG circuit 20.

After verifying the boot code 30*a* by using a root of trust 10*a*, if determining that the verification on the boot code 30*a* succeeds, the control circuit 10 may determine that the boot code 30*a* meets a requirement for secure boot, and may further control the processor configured to load the boot code 30*a* to boot. After the processor boots, the processor may obtain and load the boot code 30*a* from a nonvolatile memory 30, to implement secure boot of a device.

If determining that the verification on the boot code 30*a* fails, the control circuit 10 may determine that the boot code 30*a* does not meet a requirement for secure boot, and may further prohibit the processor from booting. Because the processor cannot boot, the boot code 30*a* cannot be loaded, and correspondingly, a device fails to boot. It may be understood that before determining that the verification on the boot code 30*a* succeeds, the control circuit 10 may prohibit the processor from booting.

For example, as shown in FIG. 3 and FIG. 4, the control circuit 10 further includes a second control pin PIN2, and the second control pin PIN2 may be coupled to a reset (RST) pin of the processor (the first processor 40 or the second processor 60). After being powered on, the control circuit 10 may first transmit a reset signal of a third electrical level to the RST pin, to prohibit the processor from booting. After obtaining the boot code 30*a* and determining that the verification on the boot code 30*a* succeeds, the control circuit 10 may transmit a release signal of a fourth electrical level to the RST pin, so that the processor boots and loads the boot code. If determining that the verification on the boot code 30a fails, the control circuit 10 may continue to transmit the reset signal of the third electrical level to the RST pin, to prohibit the processor from booting. The second control pin PIN2 may be a GPIO pin of the control circuit 10. The third electrical level may be a high electrical level relative to the fourth electrical level.

In this embodiment of this application, when determining that the verification on the boot code 30a fails, the control circuit 10 may not only prohibit the processor from booting, but also erase the boot code 30a in the nonvolatile memory 30 by using a non-programmable circuit 20. In this way, even if the processor boots incorrectly, the boot code 30a cannot be loaded. This further ensures reliability of secure boot.

In a scenario in which the non-programmable circuit 20 is the JTAG circuit, the control circuit 10 may first control, by using the method in step S11, step S13, and step S15, or the method in step S21, step S23, and step S25, the state of the JTAG circuit 20 to be the shift-DR state.

Then, in a possible example, the control circuit 10 may send an address signal and an erasure instruction to the JTAG circuit 20. The address signal indicates a storage address of the boot code 30a in the nonvolatile memory 30, and the erasure instruction indicates to delete data at a storage location indicated by the address signal. After the JTAG circuit 20 transmits the address signal and the erasure instruction to the nonvolatile memory 30 through the second interface I2, the nonvolatile memory 30 may delete the boot code 30a. For a process in which the JTAG circuit 20 transmits the address signal and the erasure instruction to the nonvolatile memory 30 through the second interface I2, refer to related descriptions of step S18 and step S28. Details are not described herein again.

In another possible example, the control circuit 10 may send an address signal, a write enable signal, and erasure data to the JTAG circuit 20. The address signal indicates a storage address of the boot code 30a in the nonvolatile memory 30, and the write enable signal indicates to write the erasure data at the storage location indicated by the address signal. After the JTAG circuit 20 transmits the address signal, the write enable signal, and the erasure data to the nonvolatile memory 30 through the second interface I2, the nonvolatile memory 30 may store the erasure data at the storage location of the boot code 30a. In other words, the nonvolatile memory 30 may overwrite the boot code 30a by using the erasure data, to erase the boot code 30a. For a process in which the JTAG circuit 20 transmits the address signal, the write enable signal, and the erasure data to the nonvolatile memory 30 through the second interface I2, refer to related descriptions of step S17 and step S19. Details are not described herein again.

It may be understood that the erasure data is data used to overwrite the boot code 30a, and data content of the erasure data may be randomly generated, or may be data of all 0s or all 1s.

In addition, in a scenario in which the non-programmable circuit 20 is a serial-to-parallel conversion circuit, the control circuit 10 may directly send an address signal and an erasure instruction to the nonvolatile memory 30 by using the serial-to-parallel conversion circuit 20, to indicate the nonvolatile memory 30 to erase the boot code 30a. Alternatively, the control circuit 10 may directly send an address signal, a write enable signal, and erasure data to the nonvolatile memory 30 by using the serial-to-parallel conversion circuit 20, to indicate the nonvolatile memory 30 to overwrite and erase the boot code 30a by using the erasure data.

In a possible implementation, a product form of the secure boot apparatus provided in this embodiment of this application may be a chip. In this implementation, the secure boot apparatus includes at least the control circuit 10 and the non-programmable circuit 20, and may further include at least one of the first multiplexer 50 and the second multiplexer 70. In addition, in this implementation, the nonvolatile memory 30 may be independent of the secure boot apparatus. In other words, the secure boot apparatus does not include the nonvolatile memory 30. If the non-programmable circuit 20 is integrated in the processor (for example, the first processor 40 described above) configured to load the boot code 30a, the secure boot apparatus may include the processor. If the non-programmable circuit 20 is independent of the processor (for example, the second processor 60 described above) configured to load the boot code 30a, the secure boot apparatus may not include the processor.

In another possible implementation, a product form of the secure boot apparatus provided in this embodiment of this application may be a board. In this implementation, in addition to the control circuit 10 and the non-programmable circuit 20, the secure boot apparatus may further include the nonvolatile memory 30, and/or the processor configured to load the boot code 30a. For example, the secure boot apparatus may include the first processor 40 or the second processor 60.

In this implementation, the secure boot apparatus may further include at least one of the first multiplexer 50 and the second multiplexer 70. In addition, all components included in the secure boot apparatus may be integrated in one circuit board.

In still another possible implementation, a product form of the secure boot apparatus provided in this embodiment of this application may be a device, and the device may be a server, a terminal device, a switching device, or the like. The terminal device may include a computer, an IoT device, and the like, and the switching device may include a switch, a router, and the like.

In this implementation, the secure boot apparatus not only includes the control circuit 10, the non-programmable circuit 20, the nonvolatile memory 30, and the processor configured to load the boot code 30a, but also may include another component, for example, may further include a housing configured to package the foregoing components, and/or a power supply circuit configured to supply power to the foregoing components.

In conclusion, this embodiment of this application provides the secure boot apparatus. The control circuit in the secure boot apparatus can obtain, by using the non-programmable circuit, the boot code stored in the nonvolatile memory, and verify the boot code by using the root of trust. In this way, even if the root of trust is not built in the processor configured to load the boot code, the boot code may be verified by using the control circuit. This effectively reduces dependency of a secure boot process on processor performance, and improves flexibility of the secure boot.

In addition, because the non-programmable circuit in the secure boot apparatus can be respectively coupled to the control circuit and the nonvolatile memory through two interfaces of different types, even if the control circuit does not have an interface that matches the nonvolatile memory, the boot code in the nonvolatile memory can still be obtained by using the non-programmable circuit. In this way, a requirement for a secure boot process on an interface protocol type of the control circuit is effectively reduced, and application flexibility of a secure boot solution is improved. In addition, because the non-programmable circuit cannot be programmed, reliability of obtaining the boot code by using the non-programmable circuit can be ensured, high reliability of a verification process is further ensured, and the requirement for the secure boot is met.

Figure 11:
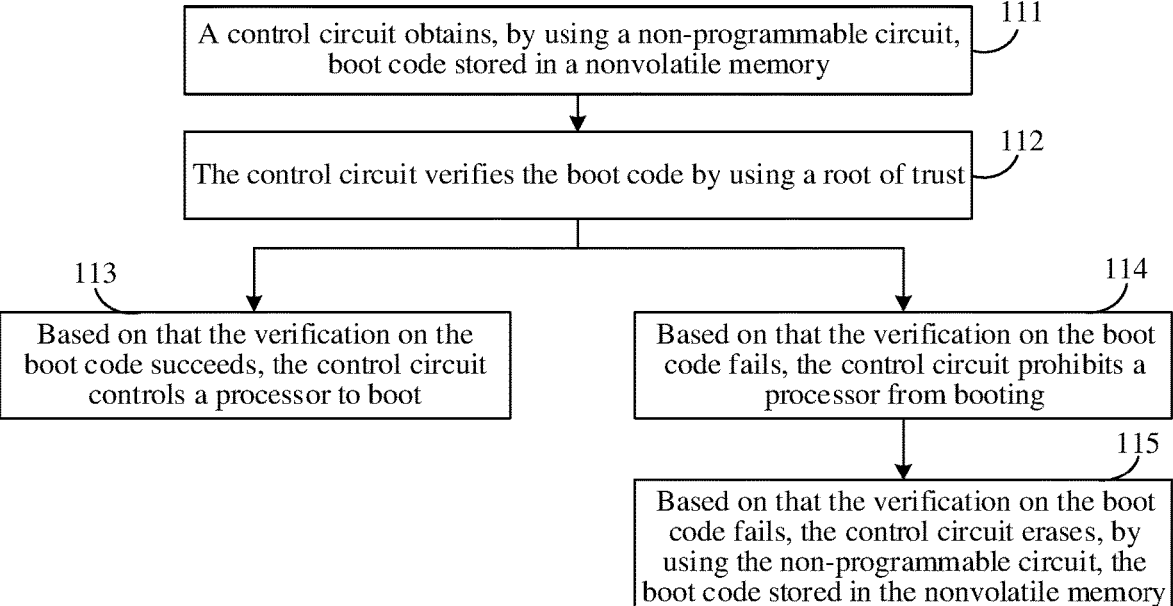
FIG. 11 is a flowchart of a secure boot method according to an embodiment of this application.

An embodiment of this application provides a secure boot method. The method may be applied to the secure boot apparatus provided in the foregoing embodiments, for example, may be applied to the apparatus in any one of FIG. 2 to FIG. 4. As shown in FIG. 11, the secure boot method includes the following steps.

Step 111: A control circuit obtains, by using a non-programmable circuit, boot code stored in a nonvolatile memory.

In this embodiment of this application, after being powered on, the control circuit may first obtain, by using the non-programmable circuit, the boot code stored in the nonvolatile memory. The control circuit may be an MCU.

Step 112: The control circuit verifies the boot code by using a root of trust.

The control circuit may verify the boot code by using the built-in root of trust of the control circuit. Therefore, even if the root of trust is not built in a processor configured to load the boot code, the control circuit may implement off-chip verification on the boot code. This effectively reduces dependency of a secure boot solution on processor performance, and improves flexibility of the secure boot.

The control circuit 10 may be further coupled to the processor configured to load the boot code 30a. For example, as shown in FIG. 3, the control circuit 10 may be coupled to the second processor 60, or as shown in FIG. 4, the control circuit 10 may be coupled to the first processor 40. Correspondingly, still refer to FIG. 11. The method may further include the following steps.

Step 113: Based on that the verification on the boot code succeeds, the control circuit controls the processor to boot.

If determining that the verification on the boot code succeeds, the control circuit may determine that the boot code meets a requirement for the secure boot, and therefore may control the processor configured to load the boot code to boot. After the processor boots, the processor may obtain the boot code from the nonvolatile memory, and may load the boot code to perform a subsequent verification procedure. For example, as shown in FIG. 1, the processor may load the boot code and verify a boot loader level by level, an OS, and an APP.

The control circuit may be coupled to a reset pin of the processor. After being powered on, the control circuit may transmit a reset signal of a third electrical level to the reset pin, to prohibit the processor from booting, that is, reset the processor. After obtaining the boot code and determining that the verification on the boot code succeeds, the control circuit may transmit a release signal of a fourth electrical level to the reset pin of the processor, to control the processor to boot. The third electrical level may be a high electrical level relative to the fourth electrical level.

Step 114: Based on that the verification on the boot code fails, the control circuit prohibits, the processor from booting.

If determining that the verification on the boot code fails, the control circuit may determine that the boot code does not meet the requirement for the secure boot, and therefore may prohibit the processor from booting. For example, the control circuit may continue to transmit the reset signal of the third electrical level to the reset pin of the processor, to prohibit the processor from booting.

As shown in FIG. 11, the method may further include the following steps.

Step 115: Based on that the verification on the boot code fails, the control circuit erases, by using the non-programmable circuit, the boot code stored in the nonvolatile memory.

If determining that the verification on the boot code fails, the control circuit may further erase the boot code. In this way, even if the processor boots incorrectly, the boot code cannot be loaded. This further ensures reliability of the secure boot.

For example, the control circuit may send an erasure instruction to the nonvolatile memory by using the non-programmable circuit, and the nonvolatile memory may erase (that is, delete) the boot code based on the erasure instruction.

Alternatively, the control circuit may send an address signal, a write enable signal, and erasure data to the nonvolatile memory by using the non-programmable circuit. The address signal indicates a storage address of the boot code in the nonvolatile memory. The nonvolatile memory may write the erasure data at a storage location of the boot code based on the address signal and the write enable signal. In other words, the nonvolatile memory may overwrite the boot code by using the erasure data, to erase the boot code.

In a specific implementation, the non-programmable circuit may be a serial-to-parallel conversion circuit, the serial-to-parallel conversion circuit has a first interface and a second interface, an interface protocol type of the first interface may be an SPI, and an interface protocol type of the second interface may be an LBUS.

Because the serial-to-parallel conversion circuit can implement interface protocol conversion between the SPI and the LBUS, the control circuit may directly obtain, by using the serial-to-parallel conversion circuit, the boot code stored in the nonvolatile memory.

In another specific implementation, the non-programmable circuit may be a JTAG circuit. The JTAG circuit may be integrated in an electronic component, and may be coupled to the nonvolatile memory through a second interface of the electronic component. The electronic component may be a CPLD or a first processor.

In a scenario in which the non-programmable circuit is the JTAG circuit, in a possible example, step 111 may include: The control circuit controls a working mode of the JTAG circuit to be a boundary scan mode; and obtains the boot code.

It may be understood that, when the JTAG circuit is in the boundary scan mode, the second interface of the electronic component to which the JTAG circuit belongs is isolated from an internal logic circuit of the electronic component. The JTAG circuit can capture the boot code received by the second interface, and transmit the boot code to the control circuit.

For a process in which the control circuit controls the working mode of the JTAG circuit to be the boundary scan mode, refer to descriptions of the foregoing steps S11 to S14. For a process in which the control circuit obtains the boot code when the JTAG circuit is in the boundary scan mode, refer to descriptions of the foregoing steps S15 and S20. Details are not described herein again.

In a scenario in which the non-programmable circuit is the JTAG circuit and the JTAG circuit is integrated in the first processor, the memory controller integrated in the first processor has the second interface coupled to the nonvolatile memory. Correspondingly, in another possible example, step 111 may include: The control circuit controls the working mode of the JTAG circuit to be a controller control mode; and obtains the boot code.

It may be understood that, when the JTAG circuit is in the controller control mode, the JTAG circuit can take over the memory controller, to obtain the boot code received by the second interface of the memory controller, and transmit the obtained boot code to the control circuit.

For a process in which the control circuit controls the working mode of the JTAG circuit to be the controller control mode, refer to descriptions of the foregoing steps S21 to S24. For a process in which the control circuit obtains the boot code when the JTAG circuit is in the controller control mode, refer to descriptions of the foregoing steps S25 and S29. Details are not described herein again.

In this embodiment of this application, in a scenario in which the interface protocol type of the first interface is the JTAG and an interface protocol type of a third interface of the control circuit is the SPI, in other words, in a scenario in which the SPI of the control circuit is coupled to the JTAG interface of the JTAG circuit, the process of obtaining the boot code by using the non-programmable circuit in step 111 may further include: The control circuit converts an interface protocol of the SPI into an interface protocol of the first interface. In other words, in a process of obtaining the boot code by using the JTAG circuit, the control circuit further needs to implement interface protocol conversion between the SPI and the JTAG interface.

In a possible example, as shown in FIG. 9, the control circuit further includes the first I/O pin. The TCK pin of the JTAG interface is coupled to the SCK pin of the SPI, and the TDO pin of the JTAG interface is coupled to the MISO pin of the SPI. One of the TDI pin and the TMS pin of the JTAG interface is coupled to the MOSI pin of the SPI, and the other one of the TDI pin and the TMS pin is coupled to the first I/O pin IO1.

In this example, a process in which the control circuit converts the interface protocol of the SPI into the interface protocol of the JTAG interface may include the following steps.

S31: The control circuit sends a TCK signal to the TCK pin through the SCK pin.

The control circuit may simulate a TCK signal through the SCK pin, and load the TCK signal to the TCK pin of the JTAG interface.

S32: The control circuit receives a TDO signal from the TDO pin through the MISO pin.

Because the MISO pin of the SPI is a pin configured to receive data, and the TDO pin of the JTAG interface is a pin configured to output data, the control circuit may receive the TDO signal from the TDO pin of the JTAG interface through the MISO pin of the control circuit.

S33: The control circuit sends a signal to one of the TDI pin and the TMS pin through the MOSI pin.

The MOSI pin of the SPI is a pin configured to output data. Therefore, the control circuit may send the signal to one of the TDI pin and the TMS pin through the MOSI pin. In other words, the control circuit may simulate, through the MOSI pin, the signal used to be loaded to one of the TDI pin and the TMS pin.

S34: The control circuit sends a signal to the other one of the TDI pin and the TMS pin through the first I/O pin.

The control circuit may also use the first I/O pin except the SPI as an auxiliary pin, and use the auxiliary pin to send the signal to the other one of the TDI pin and the TMS pin.

In other words, the control circuit may simulate, by using the auxiliary pin, the signal used to be loaded to the other pin.

In another possible example, as shown in FIG. 10, the secure boot apparatus may further include a second multiplexer, and the control circuit further includes a first I/O pin IO1 and a second I/O pin IO2; the SCK pin of the SPI is coupled to the TCK pin of the JTAG interface, and the MISO pin of the SPI is coupled to the TDO pin of the JTAG interface. The MOSI pin of the SPI is coupled to a first end I21 of the second multiplexer, a second end I22 of the second multiplexer is coupled to a TMS pin of the JTAG interface, a third end I23 of the second multiplexer is coupled to the TDI pin of the JTAG interface, a control end C21 of the second multiplexer is coupled to the first I/O pin IO1, and the second I/O pin IO2 is coupled to the TDI pin.

In this example, a process in which the control circuit converts an interface protocol of the SPI into an interface protocol of the JTAG interface may include the following steps.

S41: The control circuit sends a TCK signal to the TCK pin through the SCK pin.

For an implementation process of step S41, refer to step S31. Details are not described herein again.

S42: The control circuit receives a TDO signal from the TDO pin through the MISO pin.

For an implementation process of step S42, refer to step S32. Details are not described herein again.

S43: The control circuit controls, through the first I/O pin, the first end of the second multiplexer to be conducted with the third end; and sends a TDI signal to the TDI pin through the MOSI pin; or the control circuit controls, through the first I/O pin, the first end of the second multiplexer to be conducted with the second end; sends a TMS signal to the TMS pin through the MOSI pin; and sends the TDI signal to the TMS pin through the second I/O pin.

In this embodiment of this application, when needing to send the TDI signal to the TDI pin of the JTAG interface, the control circuit may first control, through the first I/O pin, the first end of the second multiplexer to be conducted with the third end; then simulate the TDI signal through the MOSI pin; and load the TDI signal to the TDI pin by using the second multiplexer. The TDI signal may include a first instruction, a second instruction, an address signal and a control signal, shift data or erasure data, or the like.

When needing to send the TMS signal to the TMS pin of the JTAG interface, the control circuit may first control, through the first I/O pin, the first end of the second multiplexer to be conducted with the second end; then simulate the TMS signal through the MOSI pin; and load the TMS signal to the TMS pin by using the second multiplexer. The TMS signal may include a first TMS signal or a second TMS signal. After the second multiplexer conducts the MOSI pin with the TMS pin, the control circuit may further need to transmit the TDI signal to the TDI pin. In this case, the TDI signal may be transmitted to the TDI pin through the second I/O pin IO2.

It may be understood that a sequence of steps in the foregoing method embodiments may be properly adjusted based on a situation, or steps may be correspondingly added or deleted based on the situation. For example, step 115 may be deleted based on the situation, or step 115 and step 114 may be performed simultaneously.

In conclusion, this embodiment of this application provides the secure boot apparatus. The control circuit in the secure boot apparatus can obtain, by using the non-programmable circuit, the boot code stored in the nonvolatile memory, and verify the boot code by using the root of trust.

In this way, even if the root of trust is not built in the processor configured to load the boot code, the boot code may be verified by using the control circuit. This effectively reduces dependency of a secure boot process on the processor performance, and improves flexibility of the secure boot.

In addition, because the non-programmable circuit in the secure boot apparatus can be respectively coupled to the control circuit and the nonvolatile memory through two interfaces of different types, even if the control circuit does not have an interface that matches the nonvolatile memory, the boot code in the nonvolatile memory can still be obtained by using the non-programmable circuit. In this way, a requirement for the secure boot process on the interface protocol type of the control circuit is effectively reduced, and application flexibility of the secure boot solution is improved. In addition, because the non-programmable circuit cannot be programmed, reliability of obtaining the boot code by using the non-programmable circuit can be ensured, high reliability of a verification process is further ensured, and the requirement for the secure boot is met.

It may be clearly understood by a person skilled in the art that, for the purpose of convenient and brief description, for an implementation process of each step in the foregoing method embodiments, refer to related descriptions in the foregoing secure boot apparatus embodiments. Details are not described herein again.

It may be understood that the steps performed by the control circuit in the foregoing method embodiments may also be implemented by software. When the foregoing steps are implemented by the software, the control circuit may include a software module configured to implement the foregoing steps.

Figure 12:
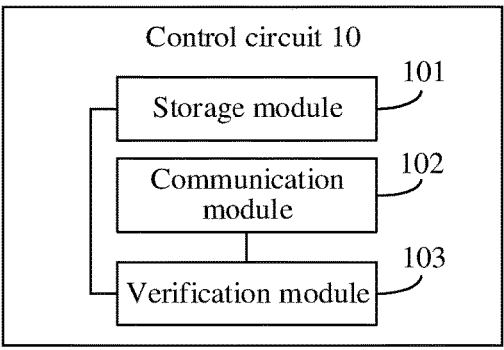
FIG. 12 is a schematic diagram of a structure of a control circuit according to an embodiment of this application.

FIG. 12 is a schematic diagram of a structure of a control circuit in a secure boot apparatus according to an embodiment of this application. As shown in FIG. 12, a control circuit 10 may include a storage module 101, a communication module 102, and a verification module 103. A non-programmable circuit 20 in the secure boot apparatus may be coupled to the communication module 102 through a first interface I1, and the non-programmable circuit 20 is coupled to a nonvolatile memory 30 through a second interface I2, and an interface protocol type of the first interface I1 is different from an interface protocol type of the second interface I2.

The storage module 101 is configured to store a root of trust.

The communication module 102 is configured to obtain, by using the non-programmable circuit 20, boot code stored in the nonvolatile memory 30. For implementation of a function of the communication module 102, refer to related descriptions of step 111.

The verification module 103 is configured to verify the boot code by using the root of trust. For implementation of a function of the verification module 103, refer to related descriptions of step 112.

The non-programmable circuit is a JTAG circuit, and communication module 102 may be configured to: control a working mode of the JTAG circuit to be a boundary scan mode; and obtain the boot code.

The communication module 102 may be configured to: send a first TMS signal to the JTAG circuit, to control a state of the JTAG circuit to be a shift-IR state; and send a first instruction to the JTAG circuit, to control the working mode of the JTAG circuit to be the boundary scan mode. For implementation of a function of the communication module 102, further refer to related descriptions of step S11 to step S14.

The communication module 102 may be configured to: send a second TMS signal to the JTAG circuit, to control the state of the JTAG circuit to be a shift-DR state; send an address signal and a control signal to the JTAG circuit, where the address signal indicates a storage address of the boot code in a nonvolatile memory, and the control signal indicates to read data in the nonvolatile memory; and send shift data to the JTAG circuit, and obtain the boot code. For implementation of a function of the communication module 102, further refer to related descriptions of step S15 to step S20.

The non-programmable circuit is the JTAG circuit, the JTAG circuit is integrated in a first processor, a memory controller is further integrated in the first processor, and the memory controller includes a second interface. The communication module 102 may be configured to: control the working mode of the JTAG circuit to be a controller control mode; and obtain the boot code.

The communication module 102 may be configured to: send a first TMS signal to the JTAG circuit, to control a state of the JTAG circuit to be a shift-IR state; and send a second instruction to the JTAG circuit, to control the working mode of the JTAG circuit to be the controller control mode. For implementation of a function of the communication module 102, further refer to related descriptions of step S21 to step S24.

The communication module 102 may be configured to: send a second TMS signal to the JTAG circuit, to control the state of the JTAG circuit to be a shift-DR state; send an address signal and a control signal to the JTAG circuit, where the address signal indicates a storage address of the boot code in the nonvolatile memory, and the control signal indicates to read data in the nonvolatile memory; and receive the boot code sent by the JTAG circuit. The boot code is obtained by the JTAG circuit through a second interface of the memory controller. For implementation of a function of the communication module 102, further refer to related descriptions of step S25 to step S29.

The non-programmable circuit includes a first interface, a protocol type of the first interface is a JTAG, and the first interface is coupled to an SPI of the communication module 102. The communication module 102 may be further configured to convert an interface protocol of the SPI into an interface protocol of the first interface, in other words, implement interface protocol conversion between the SPI and the JTAG interface.

In a possible example, the communication module 102 in the control circuit 10 further includes a first I/O pin. Refer to FIG. 9. The TCK pin of the JTAG interface is coupled to the SCK pin of the SPI, and the TDO pin of the JTAG interface is coupled to the MISO pin of the SPI. One of a TDI pin and a TMS pin of the JTAG interface is coupled to the MOSI pin of the SPI, and the other one the TDI pin and the TMS pin is coupled to the first I/O pin IO1.

In this example, the communication module 102 may be configured to: send a TCK signal to the TCK pin through the SCK pin; receive a TDO signal from the TDO pin through the MISO pin; send a signal to one of the TDI pin and the TMS pin through the MOSI pin; and send a signal to the other one of the TDI pin and the TMS pin through the first I/O pin.

For implementation of a function of the communication module 102, further refer to related descriptions of step S31 to step S34.

In another possible example, as shown in FIG. 10, the secure boot apparatus may further include a second multiplexer 70. The communication module 102 in the control circuit 10 further includes a first I/O pin IO1 and a second I/O pin IO2. As shown in FIG. 10, in this example, an SCK pin of an SPI is coupled to a TCK pin of a JTAG interface, and a MISO pin of the SPI is coupled to a TDO pin of the JTAG interface. The MOSI pin of the SPI is coupled to a first end I21 of the second multiplexer 70, a second end I22 of the second multiplexer 70 is coupled to a TMS pin of the JTAG interface, a third end I23 of the second multiplexer 70 is coupled to the TDI pin of the JTAG interface, a control end C21 of the second multiplexer 70 is coupled to the first I/O pin IO1, and the second I/O pin IO2 is coupled to the TDI pin.

In this example, the communication module 102 may be configured to: send a TCK signal to the TCK pin through the SCK pin; receive a TDO signal from the TDO pin through the MISO pin; control, through the first I/O pin, the first end of the second multiplexer to be conducted with the third end; and send a TDI signal to the TDI pin through the MOSI pin; or control, through the first I/O pin, the first end of the second multiplexer to be conducted with the second end, send a TMS signal to the TMS pin through the MOSI pin, and send the TDI signal to the TMS pin through the second I/O pin.

For implementation of a function of the communication module 102, further refer to related descriptions of step S41 to step S43.

The communication module 102 may be further configured to: based on that the verification on the boot code fails, erase, by using the non-programmable circuit, the boot code stored in the nonvolatile memory. For implementation of a function of the communication module 102, further refer to related descriptions of step 115.

An embodiment of this application further provides another control circuit. The control circuit may include a programmable logic circuit and/or program instructions, and the control circuit is configured to implement the steps performed by the control circuit in the foregoing method embodiments. For example, the apparatus may be configured to implement the method in step 111 to step 115, and may further implement the method in step S11, step S13, step S15, step S17, and step S19, or may further implement the method in step S21, step S23, step S25, and step S27.

An embodiment of this application further provides a computer-readable storage medium. The computer-readable storage medium stores instructions. The instructions are executed by a secure boot apparatus to implement the secure boot method provided in the foregoing method embodiments. For example, the method in step 111 to step 115 may be configured to be implemented, and the method in step S11 to step S20 or the method in step S21 to step S29 may be further implemented.

An embodiment of this application further provides a computer program product including instructions. When the computer program product runs on a secure boot apparatus, the secure boot apparatus is enabled to perform the secure boot method provided in the foregoing method embodiments. For example, the method in step 111 to step 115 may be performed, the method in step S11 to step S20, or the method in step S21 to step S29 may be further performed.

All or some of the foregoing embodiments may be implemented by software, hardware, firmware, or any combination thereof. When software is used to implement embodiments, the foregoing embodiments may be implemented completely or partially in a form of a computer program product. The computer program product includes one or more computer instructions. When the computer program instructions are loaded or executed on a computer, all or some of the processes or the functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), or a semiconductor medium. The semiconductor medium may be a solid-state drive (SSD).

The term "at least one" in this application means one or more, and the term "a plurality of" in this application means two or more. For example, "a plurality of I/O pins" means two or more I/O pins.

The term "and/or" mentioned in this specification represents that three relationships may exist. For example, A and/or B may represent the following three cases: Only A exists, both A and B exist, and only B exists. The character "/" usually indicates an "or" relationship between the associated objects.

The foregoing descriptions are merely implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A secure boot apparatus, comprising:
a control circuit storing a root of trust; and
a non-programmable circuit coupled to the control circuit through a first interface, wherein the non-programmable circuit is coupled to a nonvolatile memory through a second interface, and an interface protocol type of the first interface is different from an interface protocol type of the second interface, and
wherein the control circuit is configured to obtain, via the non-programmable circuit, boot code from the non-volatile memory, and verify the boot code based on the root of trust.

2. The secure boot apparatus according to claim 1, wherein the non-programmable circuit is coupled to a third interface of the control circuit through the first interface, and is coupled to a fourth interface of the nonvolatile memory through the second interface, and wherein an interface protocol type of the third interface is a serial peripheral interface (SPI), and an interface protocol type of the fourth interface is a local bus (LBUS).

3. The secure boot apparatus according to claim 1, wherein the non-programmable circuit is a joint test action group (JTAG) circuit, the JTAG circuit comprises the first interface, and the interface protocol type of the first interface is a JTAG interface.

4. The secure boot apparatus according to claim 3, wherein the JTAG circuit is integrated in an electronic component.

5. The secure boot apparatus according to claim 4, wherein the electronic component comprises a complex programmable logic device (CPLD) or a first processor, and the electronic component comprises the second interface.

6. The secure boot apparatus according to claim 3, wherein the control circuit is further configured to obtain, via the non-programmable circuit, the boot code from the nonvolatile memory by controlling a working mode of the JTAG circuit to be a boundary scan mode; and obtaining the boot code.

7. The secure boot apparatus according to claim 6, wherein the controlling a working mode of the JTAG circuit to be a boundary scan mode comprises:

sending a first test mode selection signal to the JTAG circuit, to control a state of the JTAG circuit to be a shift instruction register (IR) state; and sending a first instruction to the JTAG circuit, to control the working mode of the JTAG circuit to be the boundary scan mode.

8. The secure boot apparatus according to claim 6, wherein the control circuit is further configured to obtain, via the non-programmable circuit, the boot code from the nonvolatile memory by:

sending a second test mode selection signal to the JTAG circuit, to control the state of the JTAG circuit to be a shift data register (DR) state;

sending an address signal and a control signal to the JTAG circuit, wherein the address signal indicates a storage address of the boot code in the nonvolatile memory, and the control signal indicates to read data in the nonvolatile memory; and sending shift data to the JTAG circuit, and obtaining the boot code.

9. The secure boot apparatus according to claim 5, wherein the JTAG circuit is integrated in the CPLD, and the secure boot apparatus further comprises a first multiplexer, wherein the control circuit is coupled to each of a control end and a first end of the first multiplexer, a second end of the first multiplexer is coupled to a JTAG interface of a second processor, and a third end of the first multiplexer is coupled to the first interface of the JTAG circuit, wherein the control circuit is further configured to control the third end of the first multiplexer to be conducted with the first end, or control the third end of the first multiplexer to be conducted with the second end, and wherein the first end, the second end, and the third end of the first multiplexer are all JTAG interfaces.

10. The secure boot apparatus according to claim 5, wherein the JTAG circuit is integrated in the first processor, a memory controller is further integrated in the first processor, and the memory controller comprises the second interface, and wherein the control circuit is further configured to obtain, via the non-programmable circuit, the boot code from the nonvolatile memory by controlling a working mode of the JTAG circuit to be a controller control mode; and obtaining the boot code.

11. A secure boot method implemented by a secure boot apparatus, comprising:

obtaining, by a control circuit of the secure boot apparatus via a non-programmable circuit of the secure boot apparatus, boot code from a nonvolatile memory, wherein the secure boot apparatus includes the control circuit and the non-programmable circuit, wherein the non-programmable circuit is coupled to the control circuit through a first interface, wherein the non-programmable circuit is coupled to the nonvolatile memory through a second interface, wherein an interface protocol type of the first interface is different from an interface protocol type of the second interface, and wherein the control circuit stores a root of trust; and verifying, by the control circuit, the boot code based on the root of trust.

12. The method according to claim 11, wherein the non-programmable circuit is a joint test action group (JTAG) circuit, and the obtaining, by the control circuit of the secure boot apparatus via the non-programmable circuit of the secure boot apparatus, the boot code from the nonvolatile memory comprises:

controlling, by the control circuit, a working mode of the JTAG circuit to be a boundary scan mode; and obtaining, by the control circuit, the boot code.

13. The method according to claim 12, wherein the controlling, by the control circuit, the working mode of the JTAG circuit to be the boundary scan mode comprises:

sending, by the control circuit, a first test mode selection signal to the JTAG circuit;

setting, by the JTAG circuit, a state to a shift instruction register (IR) state based on the first test mode selection signal;

sending, by the control circuit, a first instruction to the JTAG circuit; and setting, by the JTAG circuit, the working mode to the boundary scan mode based on the first instruction.

14. The method according to claim 12, wherein the obtaining, by the control circuit of the secure boot apparatus via the non-programmable circuit of the secure boot apparatus, the boot code from the nonvolatile memory comprises:

sending, by the control circuit, a second test mode selection signal to the JTAG circuit;

setting, by the JTAG circuit, the state to a shift data register (DR) state based on the second test mode selection signal;

sending, by the control circuit, an address signal and a control signal to the JTAG circuit, wherein the address signal indicates a storage address of the boot code in the nonvolatile memory, and the control signal indicates to read data in the nonvolatile memory;

loading, by the JTAG circuit, the address signal and the control signal to the second interface, and obtaining the boot code received by the second interface;

sending, by the control circuit, shift data to the JTAG circuit; and sending, by the JTAG circuit, the obtained boot code to the control circuit based on the shift data.

15. The method according to claim 11, wherein the non-programmable circuit is a JTAG circuit, the JTAG circuit is integrated in a first processor, a memory controller is further integrated in the first processor, and the memory controller comprises the second interface, and wherein the obtaining, by the control circuit of the secure boot apparatus via the non-programmable circuit of the secure boot apparatus, the boot code from the nonvolatile memory comprises:

controlling, by the control circuit, a working mode of the JTAG circuit to be a controller control mode; and obtaining, by the control circuit, the boot code.

16. The method according to claim 15, wherein the controlling, by the control circuit, the working mode of the JTAG circuit to be the controller control mode comprises:

sending, by the control circuit, a first test mode selection signal to the JTAG circuit;

setting, by the JTAG circuit, a state to a shift-IR state based on the first test mode selection signal;

sending, by the control circuit, a second instruction to the JTAG circuit; and setting, by the JTAG circuit, the working mode to the controller control mode based on the second instruction.

17. The method according to claim 15, wherein the obtaining, by the control circuit, the boot code comprises:

sending, by the control circuit, a second test mode selection signal to the JTAG circuit;

setting, by the JTAG circuit, a state to a shift-DR state based on the second test mode selection signal;

sending, by the control circuit, an address signal and a control signal to the JTAG circuit, wherein the address signal indicates a storage address of the boot code in the nonvolatile memory, and the control signal indicates to read data in the nonvolatile memory;

loading, by the JTAG circuit, the address signal and the control signal to the second interface, and obtaining the boot code received by the second interface; and sending, by the JTAG circuit, the obtained boot code to the control circuit.

18. The method according to claim 11, wherein the non-programmable circuit comprises the first interface, the protocol type of the first interface is a JTAG, and the first interface is coupledcoupled to a serial peripheral interface SPI of the control circuit, and wherein the obtaining, by the control circuit of the secure boot apparatus via the non-programmable circuit of the secure boot apparatus, the boot code from the nonvolatile memory further comprises:

converting, by the control circuit, an interface protocol of the SPI into an interface protocol of the first interface.

19. The method according to claim 18, wherein the secure boot apparatus further comprises a second multiplexer, and the control circuit further comprises a first I/O pin and a second I/O pin, wherein the SPI comprises a serial clock (SCK) pin, a master output slave input (MOSI) pin, and a master input slave output (MISO) pin, wherein the first interface comprises a test clock (TCK) pin, a test data input (TDI) pin, a test data output (TDO) pin, and a test mode selection (TMS) pin, wherein the SCK pin is coupled-coupled to the TCK pin, the MISO pin is coupledcoupled to the TDO pin, the MOSI pin is coupled to a first end of the second multiplexer, a second end of the second multiplexer is coupled to the TMS pin, a third end of the second multiplexer is coupled to the TDI pin, a control end of the second multiplexer is coupled to the first I/O pin, and the second I/O pin is coupled to the TDI pin, and wherein the converting, by the control circuit, the interface protocol of the SPI into the interface protocol of the first interface comprises:

sending, by the control circuit, a TCK signal to the TCK pin through the SCK pin;

receiving, by the control circuit, a TDO signal from the TDO pin through the MISO pin; and controlling, by the control circuit through the first I/O pin, the first end of the second multiplexer to be conducted with the third end, and sending a TDI signal to the TDI pin through the MOSI pin; or controlling, by the control circuit through the first I/O pin, the first end of the second multiplexer to be conducted with the second end, sending a TMS signal to the TMS pin through the MOSI pin, and sending the TDI signal to the TMS pin through the second I/O pin.

20. The method according to claim 18, wherein the control circuit further comprises a first I/O pin, the SPI comprises an SCK pin, an MOSI pin, and an MISO pin, and the first interface comprises a TCK pin, a TDI pin, a TDO pin, and a TMS pin, wherein the TCK pin is coupled to the SCK pin, the TDO pin is coupled to the MISO pin, one of the TDI pin and the TMS pin is coupled to the MOSI pin, and the other one of the TDI pin and the TMS pin is coupled to the first I/O pin, and wherein the converting, by the control circuit, the interface protocol of the SPI into the interface protocol of the first interface comprises:

sending, by the control circuit, a TCK signal to the TCK pin through the SCK pin;

receiving, by the control circuit, a TDO signal from the TDO pin through the MISO pin;

sending, by the control circuit, a signal to one of the TDI pin and the TMS pin through the MOSI pin; and sending, by the control circuit, a signal to the other one of the TDI pin and the TMS pin through the first I/O pin.

\* \* \* \* \*